(12) United States Patent
Beucher et al.

(10) Patent No.: US 12,733,651 B2
(45) Date of Patent: Sep. 15, 2026

(54) DEVICE FOR THE MANUFACTURE OF SKEWERS OF FOOD PRODUCTS COMPRISING A MOBILE SKEWER PICKER SYNCHRONIZED WITH THE MOVEMENT OF THE TRAYS FOR RECEIVING THE FOOD PRODUCTS

(71) Applicant: SYSTEM B, Change (FR)

(72) Inventors: Jérémy Beucher, Bonchamp (FR); Xavier Dumas, Chateaugiron (FR)

(73) Assignee: SYSTEM B, Change (FR)

( * ) Notice: Subject to any disclaimer, the term of this patent is extended or adjusted under 35 U.S.C. 154(b) by 681 days.

(21) Appl. No.: 18/262,764

(22) PCT Filed: Jan. 26, 2022

(86) PCT No.: PCT/EP2022/051688

§ 371 (c)(1), (2) Date: Jul. 25, 2023

(87) PCT Pub. No.: WO2022/161977

PCT Pub. Date: Aug. 4, 2022

(65) Prior Publication Data

US 2024/0156113 A1 May 16, 2024

(30) Foreign Application Priority Data

Jan. 26, 2021 (FR) ....................................... 2100712

(51) Int. Cl.
*A22C 17/00* (2006.01)
*A23P 10/10* (2016.01)

(52) U.S. Cl.
CPC ............ *A22C 17/006* (2013.01); *A23P 10/10* (2016.08)

(58) Field of Classification Search
None
See application file for complete search history.

(56) References Cited

U.S. PATENT DOCUMENTS 3,939,761 A * 2/1976 McGinty ............. A47J 37/0745 99/421 V
4,078,478 A * 3/1978 Geisel ................... A47J 37/049 99/421 H (Continued)

FOREIGN PATENT DOCUMENTS

DE 8915630 U1 1/1991
FR 3076185 A1 7/2019

(Continued)

OTHER PUBLICATIONS

International Search Report dated Jul. 7, 2022 for corresponding International Application No. PCT/EP2022/051688, filed Jan. 26, 2022.

(Continued)

*Primary Examiner* — Thor S Campbell
(74) *Attorney, Agent, or Firm* — David D. Brush; Westman, Champlin & Koehler, P.A.

(57) ABSTRACT

A device for manufacturing a skewer. The device includes a mobile carriage mounted to slide on a frame between forward and rear positions, and vice versa. The mobile carriage includes a lower tray cooperating with an upper tray, the upper tray being mounted to move between opened and closed positions, the lower and upper trays having recesses forming a row of aligned cavities when the upper tray is closed and an orifice for passing a spike opening into the row. The device includes a spike reservoir and a mobile spike extractor configured to selectively take a spike from the reservoir and position the spike facing the orifice when the mobile carriage is in the rear position, and a synchronizer configured to synchronise the movement of the mobile spike extractor with the movement of the mobile carriage.

12 Claims, 18 Drawing Sheets

(56) References Cited

U.S. PATENT DOCUMENTS 4,154,154 A * 5/1979 Vivian .................. A47J 37/041 99/419
4,158,991 A * 6/1979 Nakashima ........... A47J 37/041 99/421 H
4,352,242 A * 10/1982 Plet ......................... B26B 27/00 30/316
4,429,435 A * 2/1984 Walls ................... A22C 17/006 99/419
4,893,553 A * 1/1990 Emsens ................ A22C 17/006 99/450.2
5,001,971 A * 3/1991 Beller ................... A47J 37/041 99/421 A
5,127,319 A * 7/1992 Dolle ................... A22C 17/006 99/421 H
5,168,798 A * 12/1992 Kristofich ............. A47J 37/041 99/421 A
5,669,290 A * 9/1997 Natsumi ............... A47J 37/041 99/421 H
5,715,744 A * 2/1998 Coutant ................ A47J 37/041 99/421 A
5,740,722 A * 4/1998 Emsens ................ A22C 17/006 99/421 H
5,887,513 A * 3/1999 Fielding ............. A47J 37/0694 99/421 A
6,047,633 A * 4/2000 Khaytman ............ A47J 37/049 99/421 V
6,161,471 A * 12/2000 Emsens ................ A22C 17/006 99/421 H
6,837,151 B2 * 1/2005 Chen ..................... A47J 37/041 99/421 H
7,934,448 B2 * 5/2011 Walser ............... A22C 17/0066 227/39
8,025,008 B2 * 9/2011 Walser ................. A22C 17/006 425/126.2
9,107,542 B1 * 8/2015 Al-Raqadi .............. A47J 43/18
9,668,493 B2 * 6/2017 Völkl ................... A22C 17/006
10,045,661 B2 * 8/2018 Mollet ..................... A23P 10/10
2003/0015100 A1 * 1/2003 Wrenn .................. A47J 37/106 426/523
2005/0022676 A1 * 2/2005 Swank .................... F24C 15/02 99/419
2008/0034980 A1 * 2/2008 Nardone ............. A47J 37/0786 99/421 A
2009/0241784 A1 * 10/2009 Colby ....................... A23L 5/15 99/421 A
2009/0311400 A1 * 12/2009 Allen .................. A47J 37/0694 426/523
2010/0122630 A1 * 5/2010 Nimerovskiy ........ A47J 37/041 99/421 H
2012/0097046 A1 * 4/2012 Jones .................. A47J 37/0629 99/334
2012/0186461 A1 * 7/2012 Carson ............... A47J 37/0763 99/421 H
2012/0204732 A1 * 8/2012 Dondurur ............. A47J 37/041 99/427
2013/0104744 A1 * 5/2013 Oi ....................... A47J 37/0786 99/421 H
2014/0230665 A1 * 8/2014 Balcerzak ........... A47J 37/0688 99/419
2014/0261013 A1 * 9/2014 Brown .................. A47J 37/041 99/421 R
2014/0338545 A1 * 11/2014 Ramadan .............. A47J 37/049 99/445
2015/0033955 A1 * 2/2015 Fung .................... A47J 37/0611 29/428
2015/0144010 A1 * 5/2015 Carson .................. A47J 37/041 99/421 R
2015/0313407 A1 * 11/2015 Mollet ................. A22C 17/006 269/45
2017/0027384 A1 * 2/2017 Merriman ............... A23L 19/05
2023/0404322 A1 * 12/2023 Jamali ................... A47J 37/045
2024/0156113 A1 * 5/2024 Beucher ............... A22C 17/006

FOREIGN PATENT DOCUMENTS

JP S6371163 A 3/1988
WO 2019092325 A1 5/2019
WO 2020259850 A1 12/2020
WO 2022161977 A1 8/2022

OTHER PUBLICATIONS

Written Opinion of the International Searching Authority dated Jul. 7, 2022 for corresponding International Application No. PCT/EP2022/051688, filed Jan. 26, 2022.
French Search Report and Written Opinion dated Oct. 6, 2021 for corresponding French Application No. 2100712, filed Jan. 26, 2021.
English translation of the Written Opinion of the International Searching Authority dated Nov. 15, 2022 for corresponding International Application No. PCT/EP2022/051688, filed Jan. 26, 2022.

* cited by examiner

[Fig. 1A]
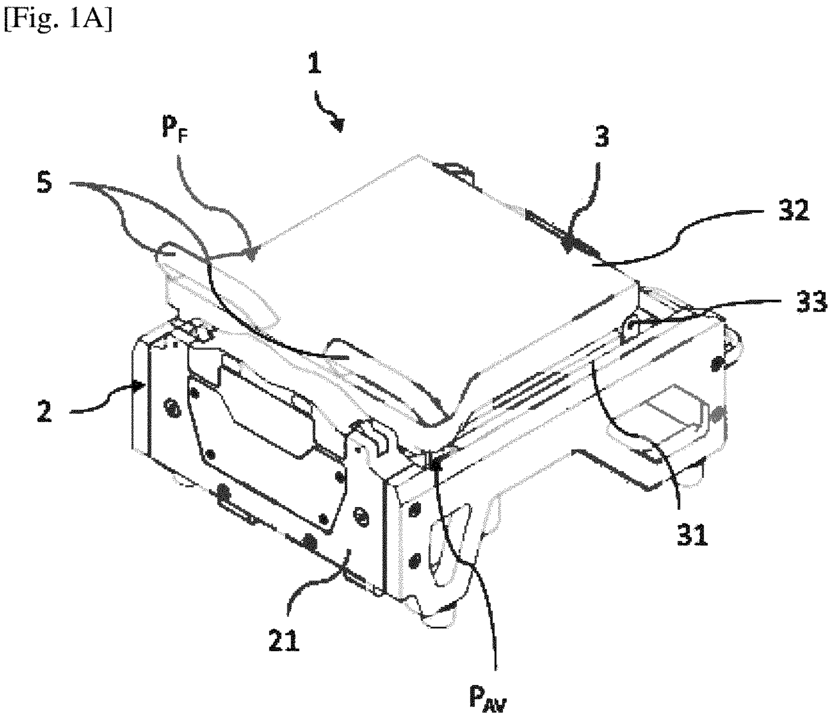
[Fig. 1B]
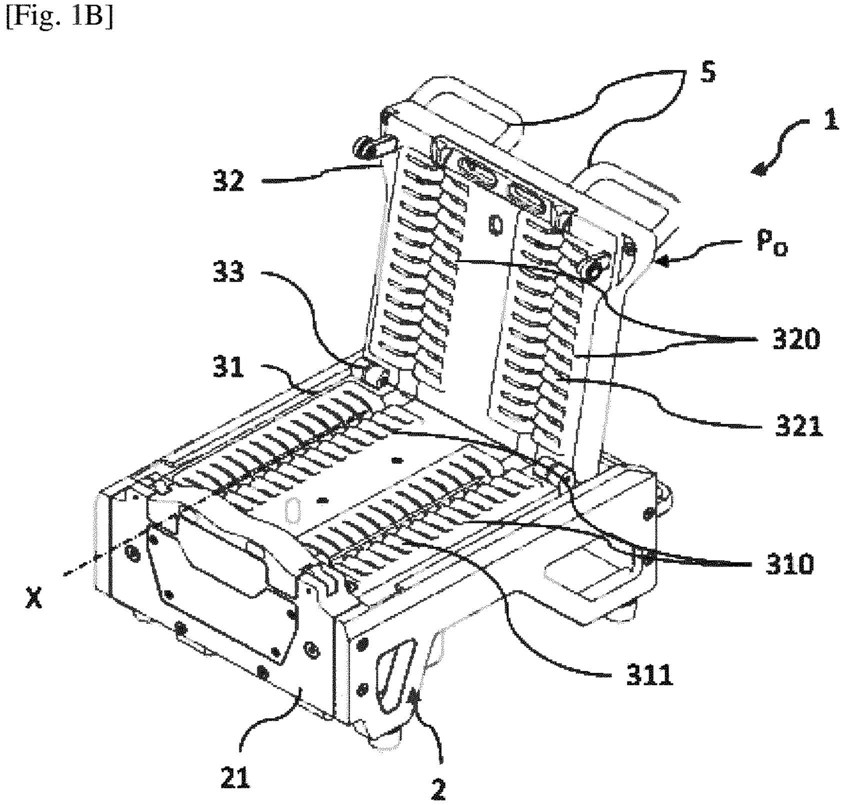

[Fig. 1C]
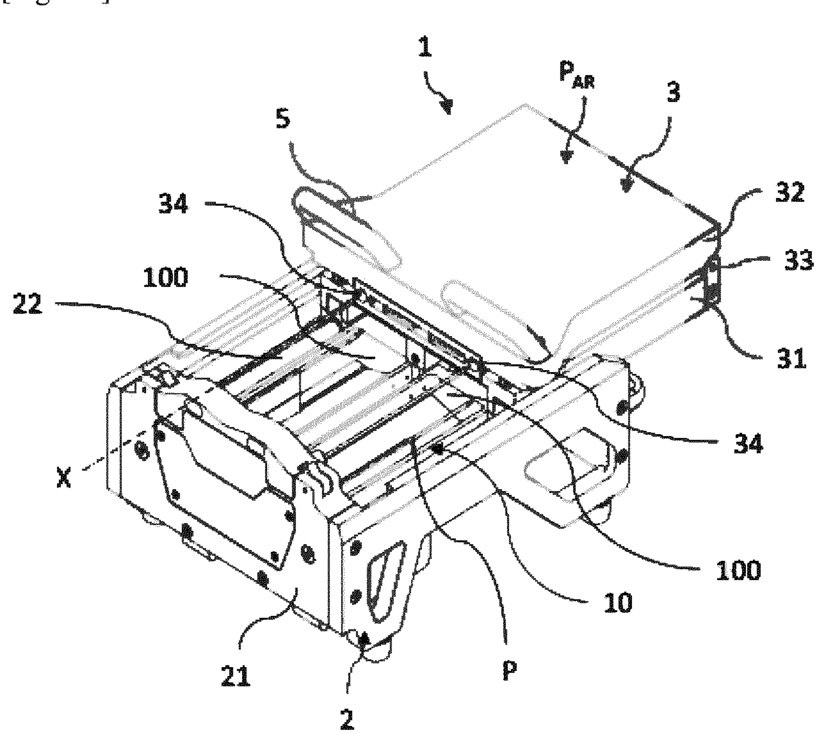
[Fig. 2]
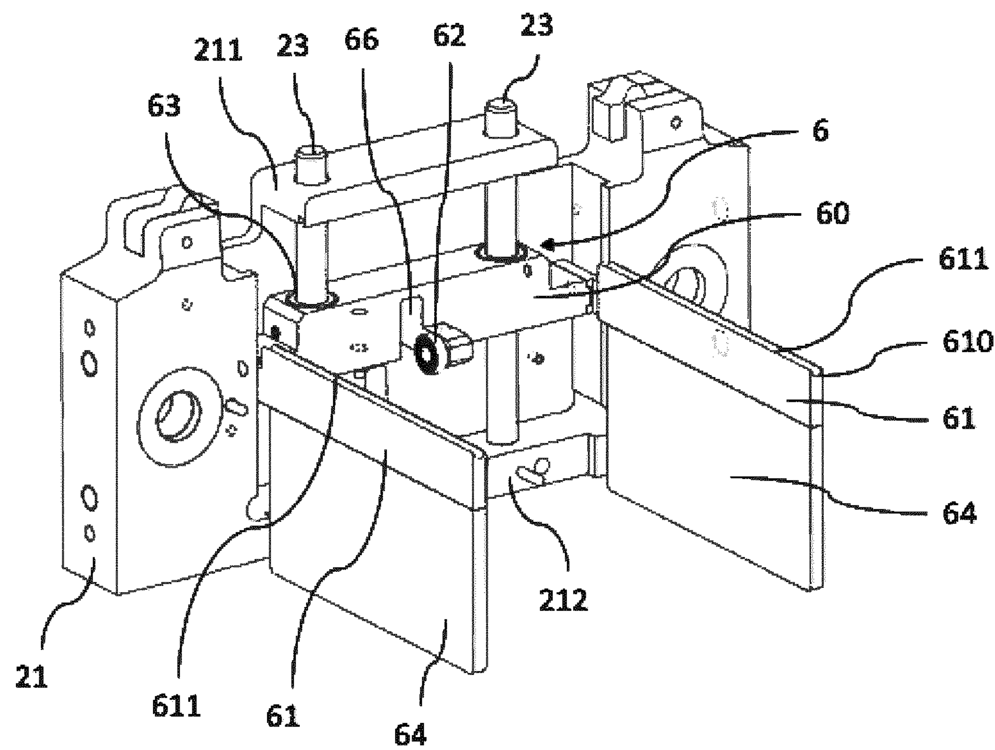

[Fig. 3A]
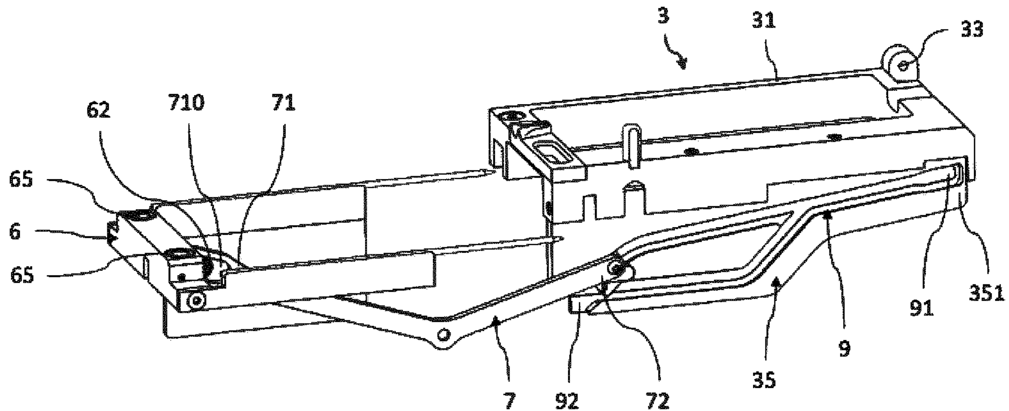
[Fig. 3B]
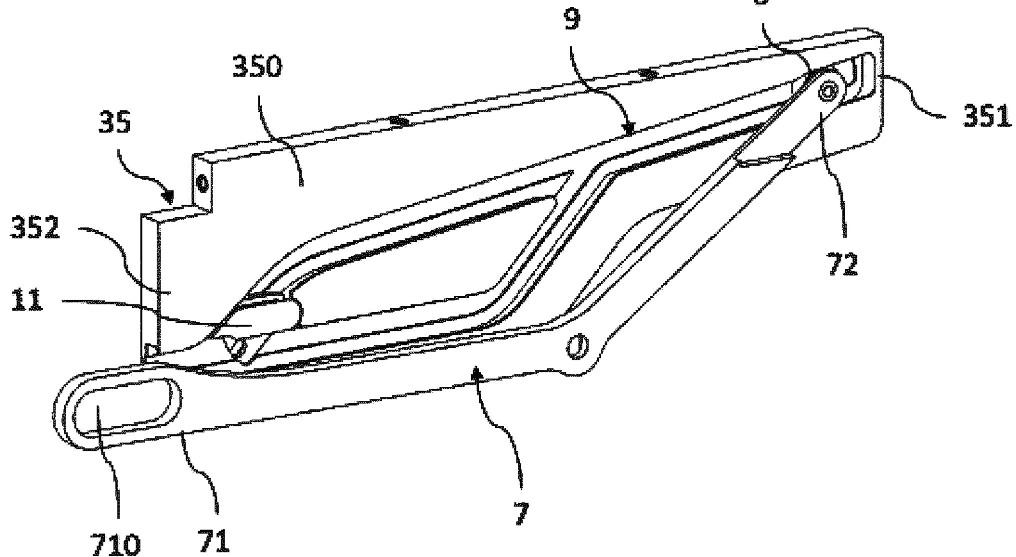
[Fig. 3C]
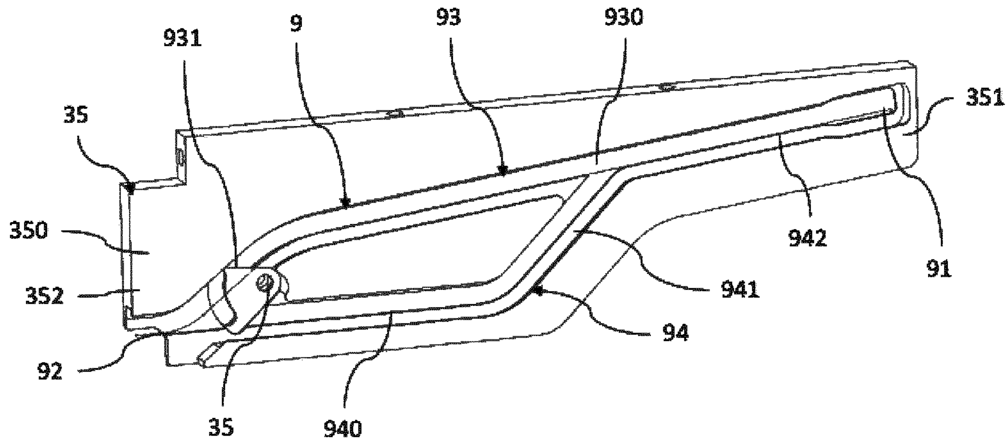

[Fig. 3D]
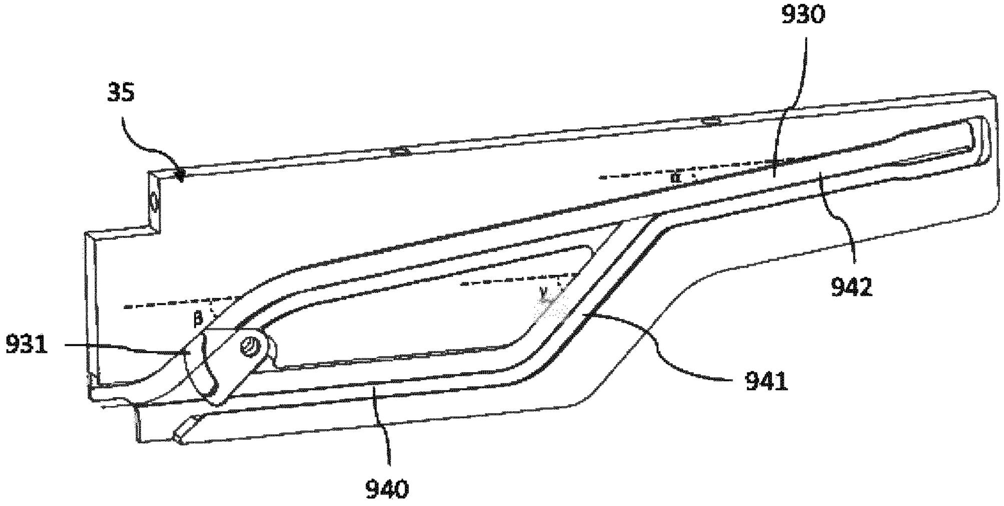
[Fig. 4A]
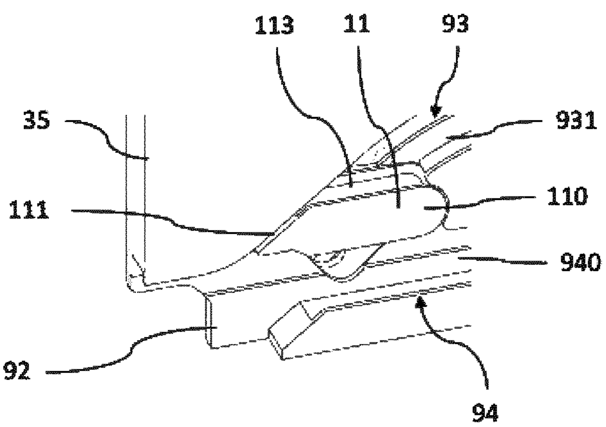
[Fig. 4B]
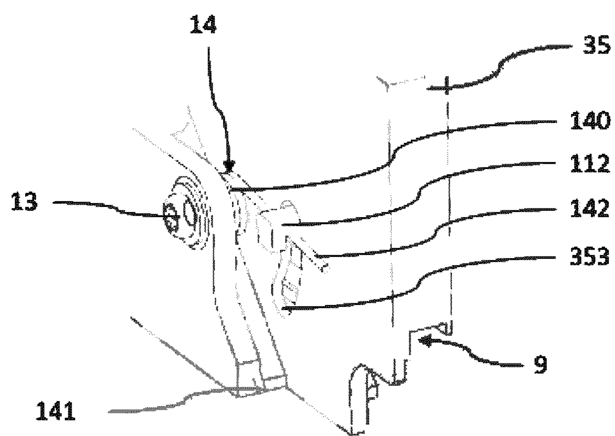

[Fig. 5A]
8
35
931
93
11
7
[Fig. 5B]
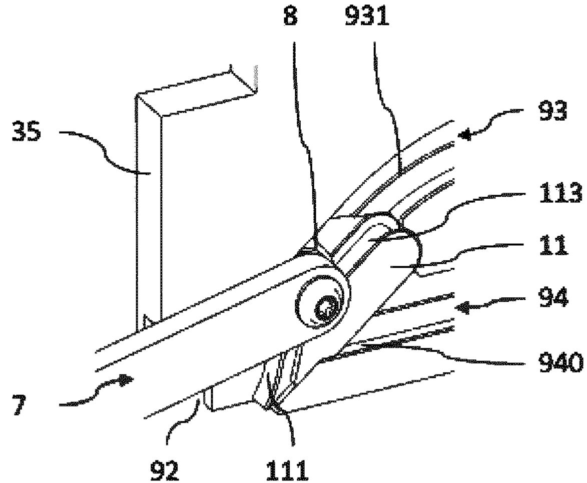
[Fig. 5C]
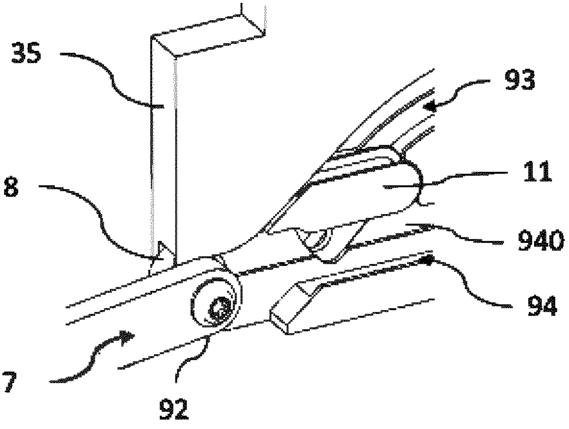

[Fig. 5D]
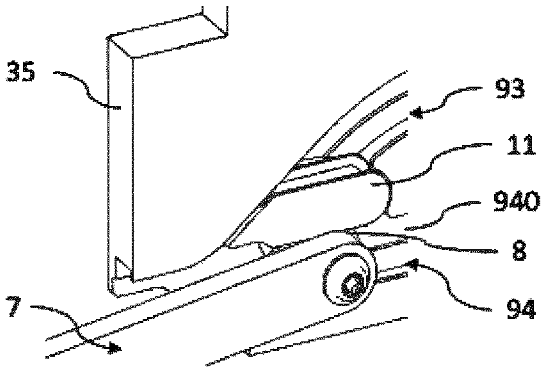
[Fig. 6]
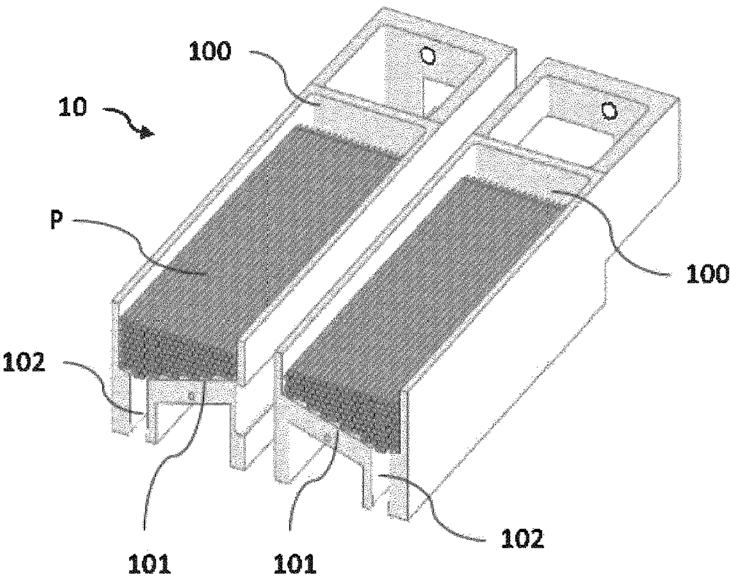
[Fig. 7A]
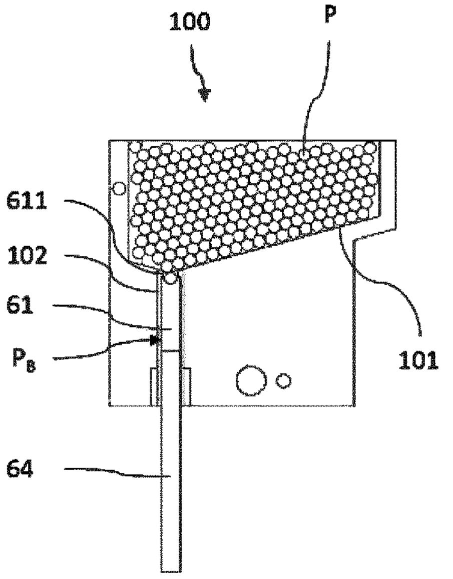

[Fig. 7B]
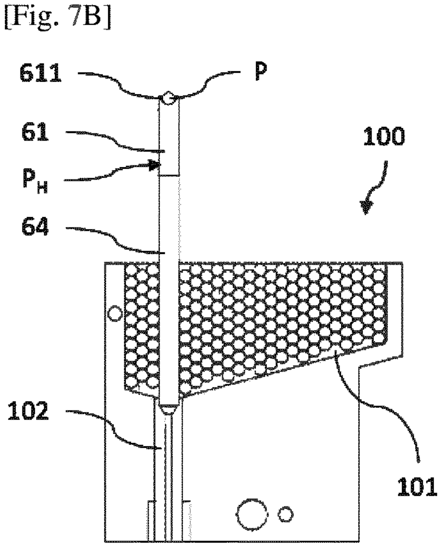
[Fig. 8A]
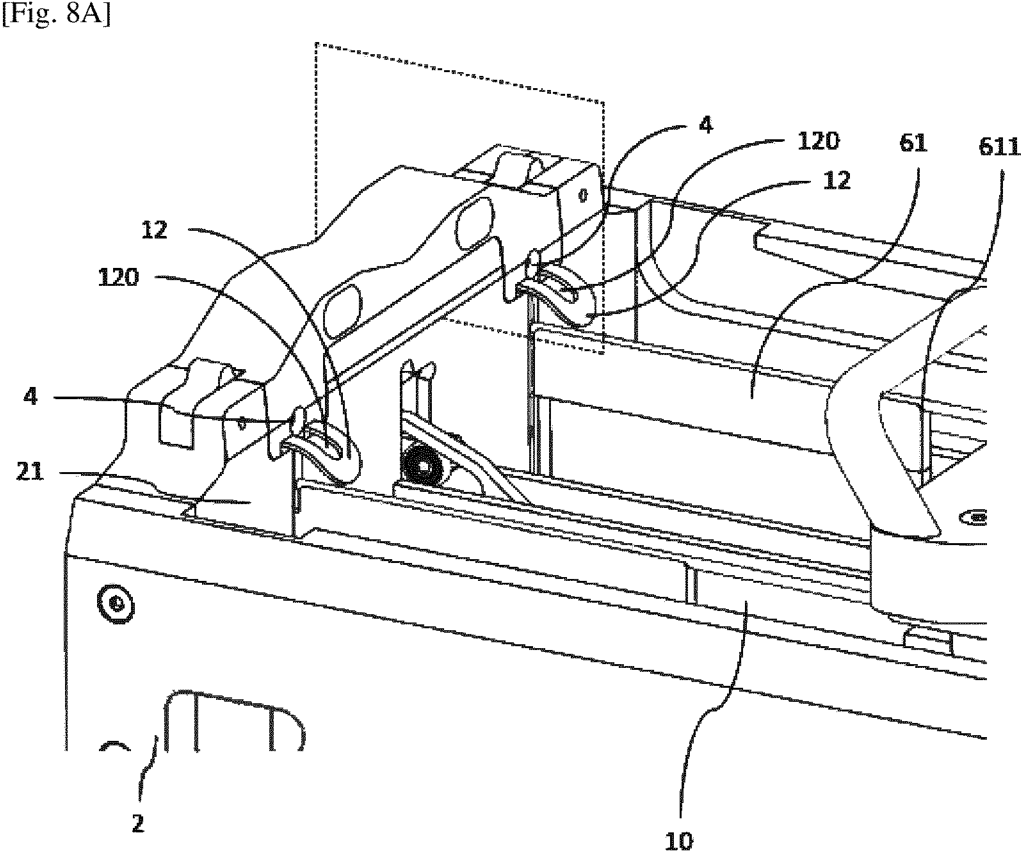

[Fig. 8B]
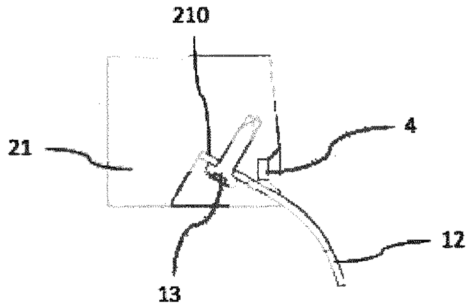
[Fig. 8C]
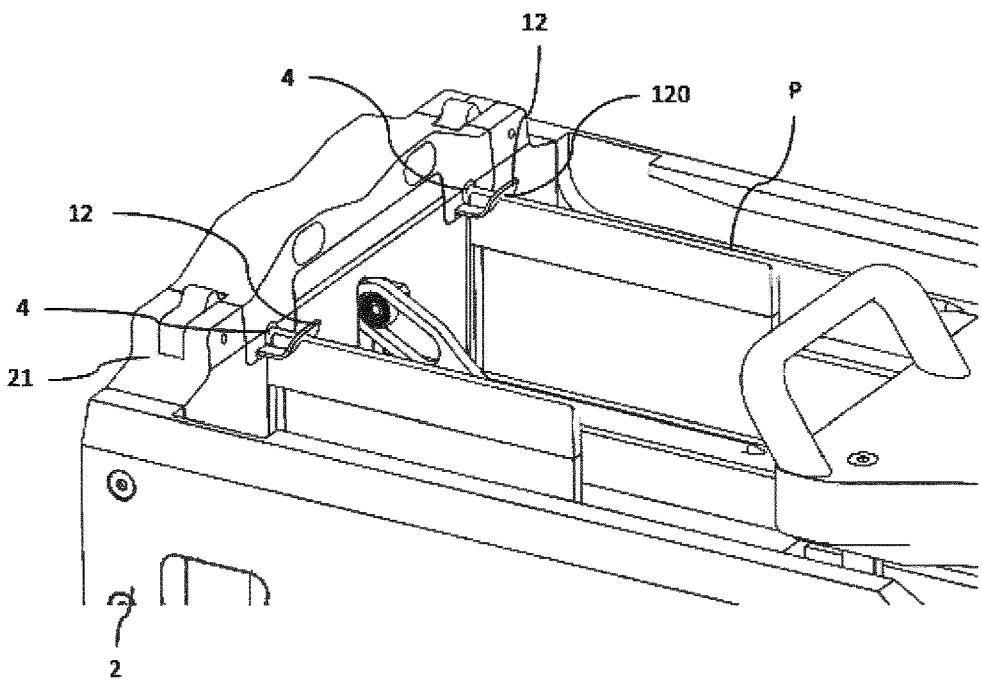
[Fig. 9]
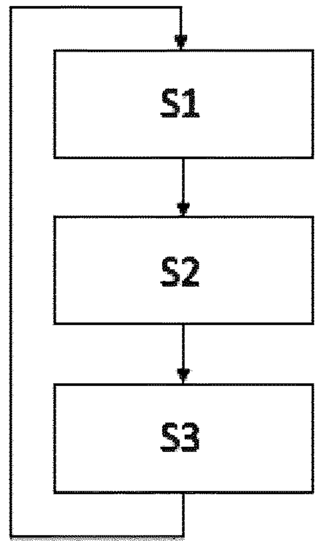

[Fig. 10A]
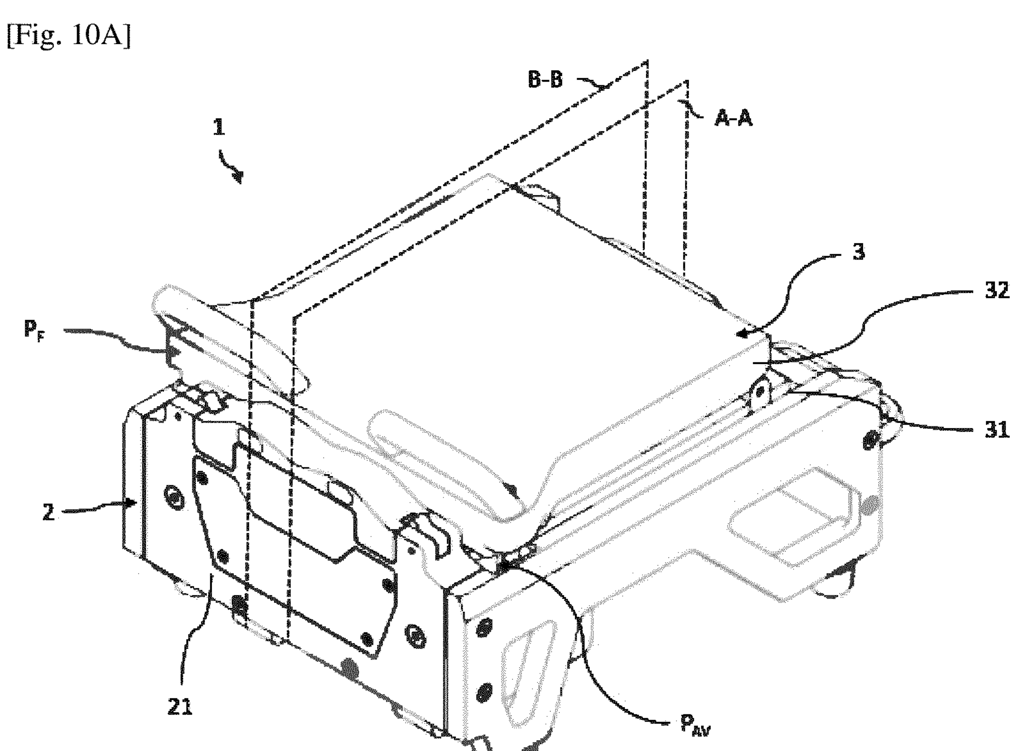
[Fig. 10B]
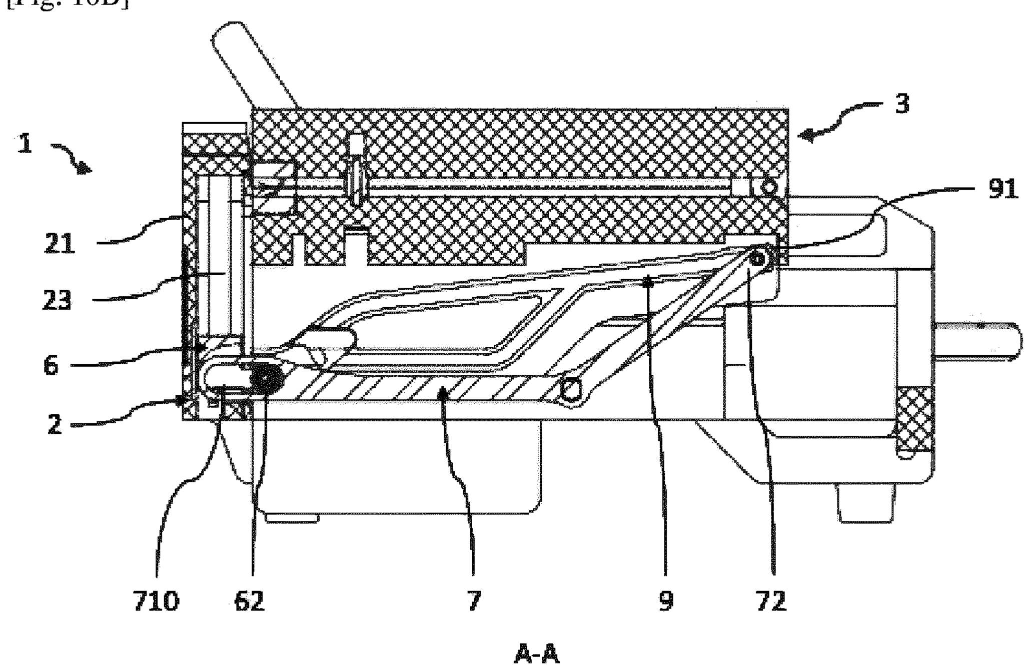

[Fig. 10C]
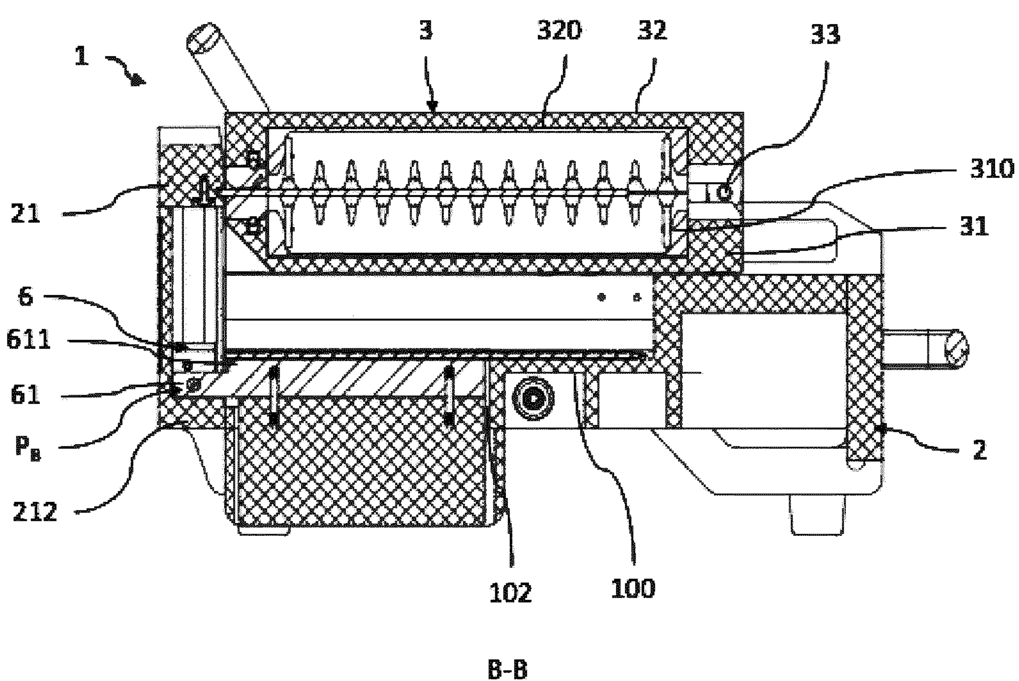
[Fig. 11A]
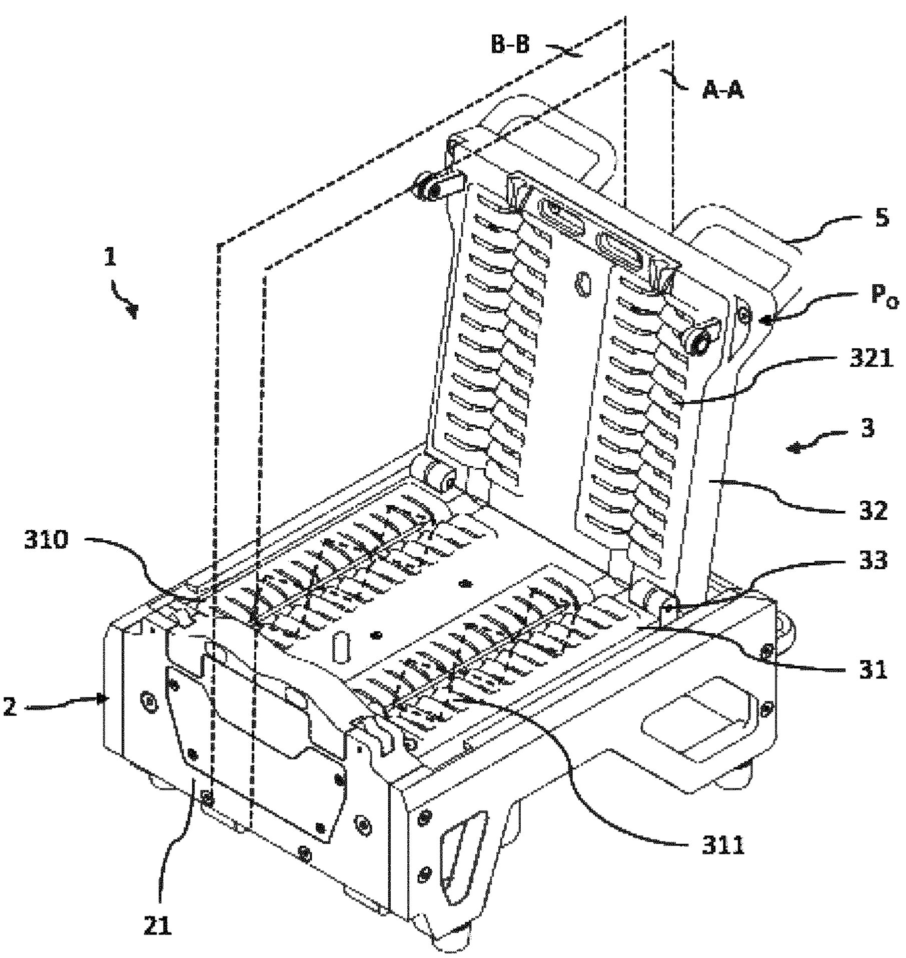

[Fig. 11B]
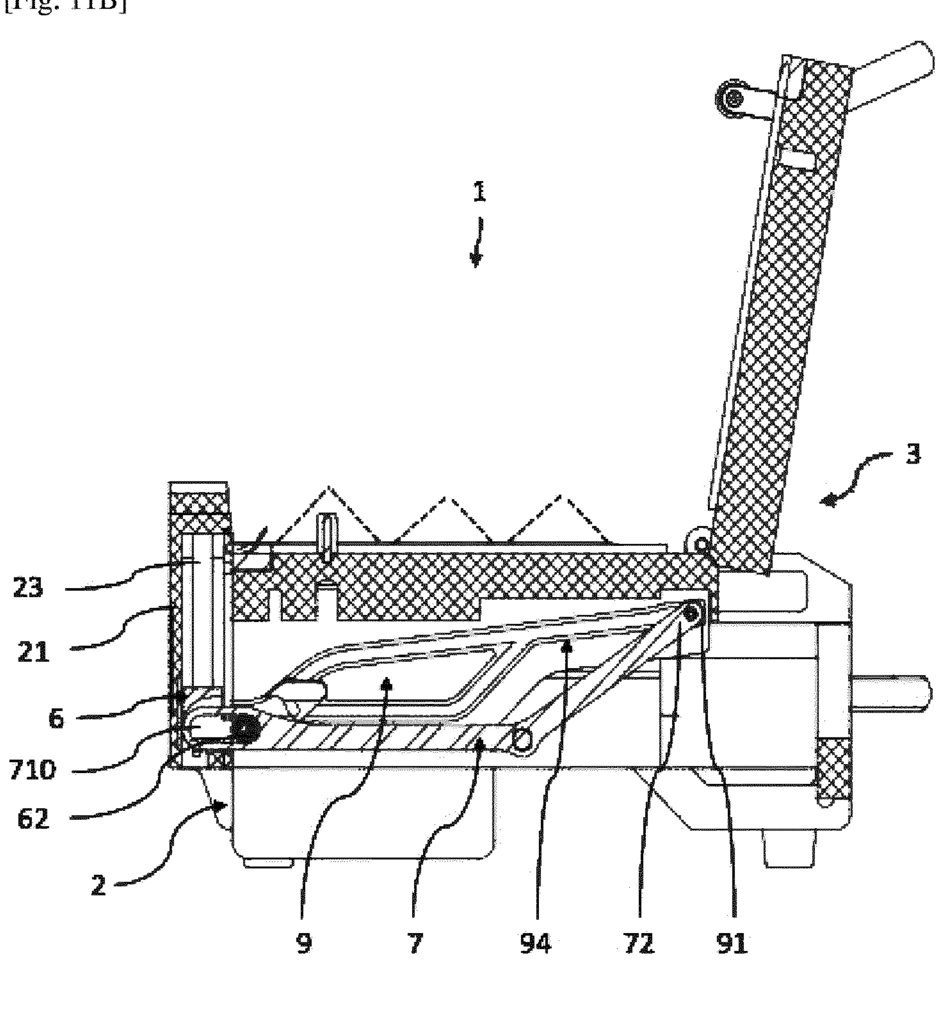

[Fig. 11C]
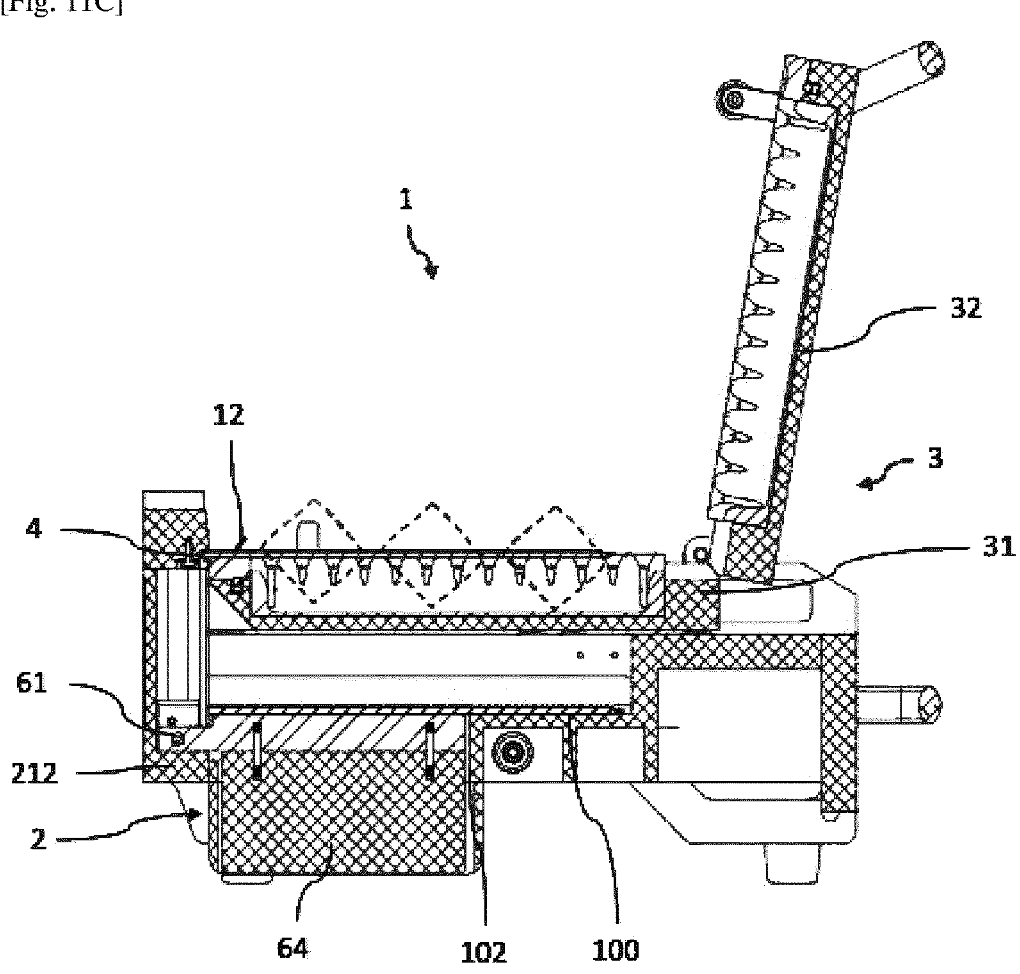

[Fig. 12A]
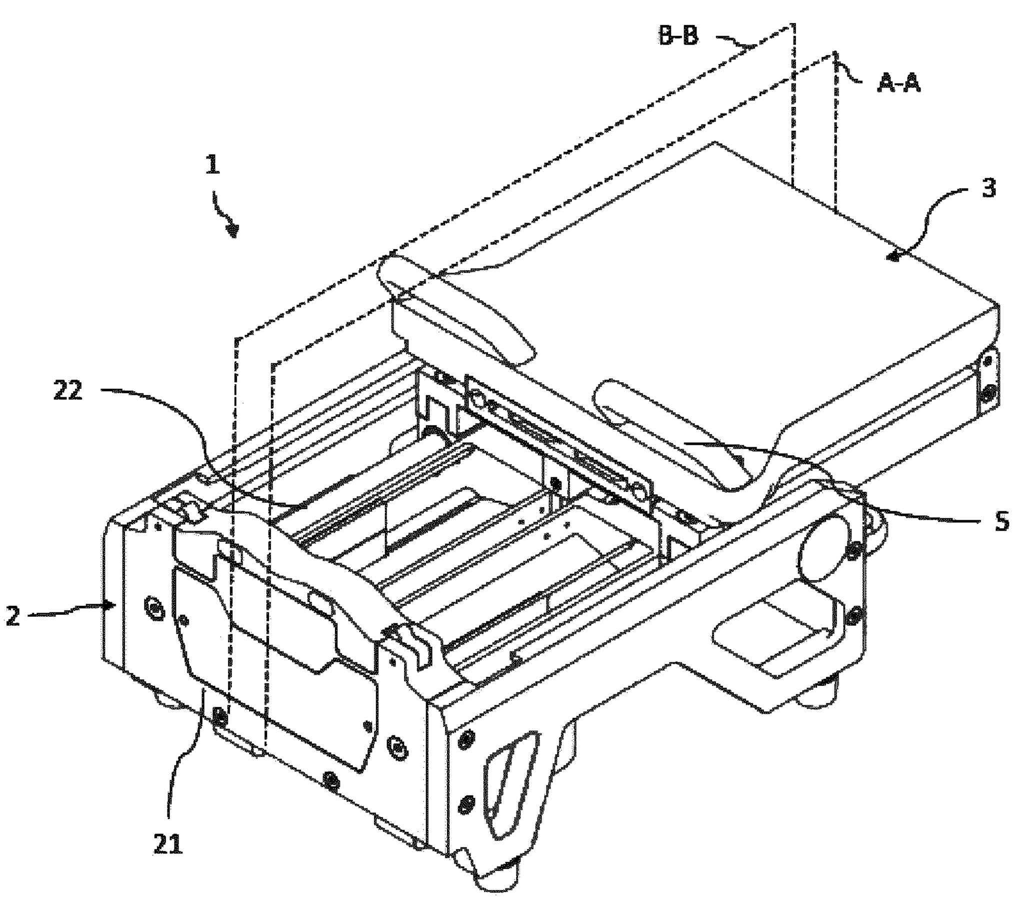
[Fig. 12B]
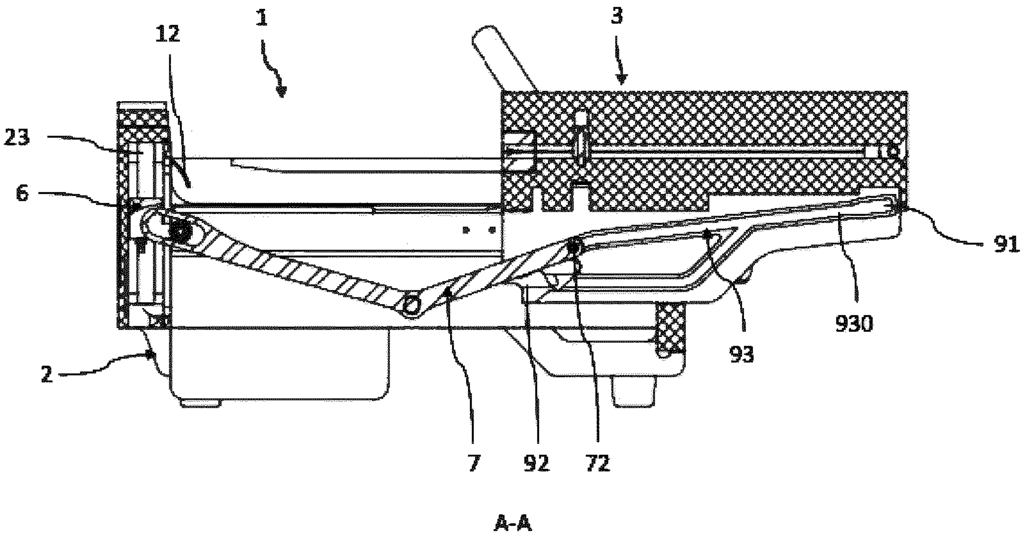

[Fig. 12C]
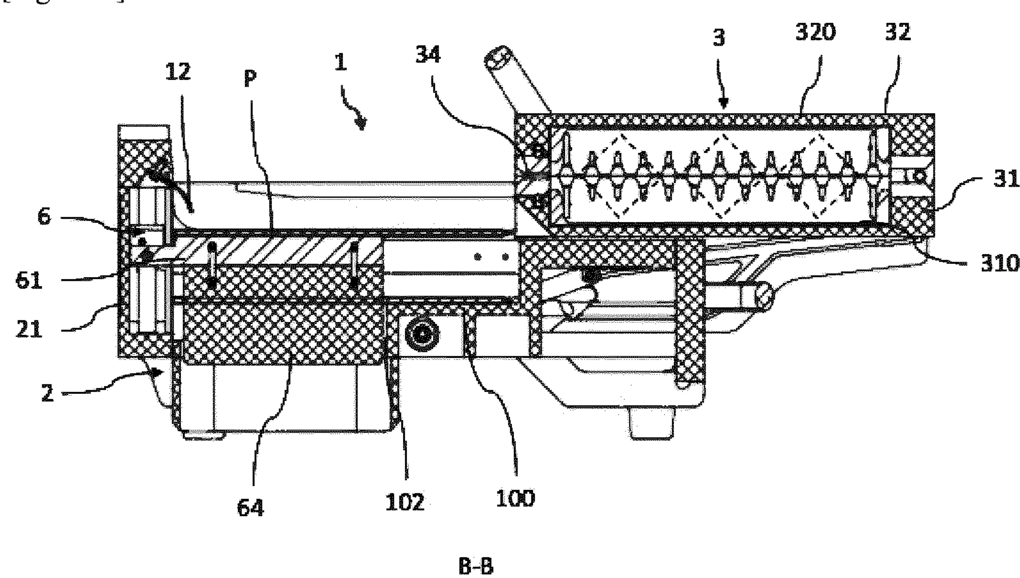
[Fig. 13A]
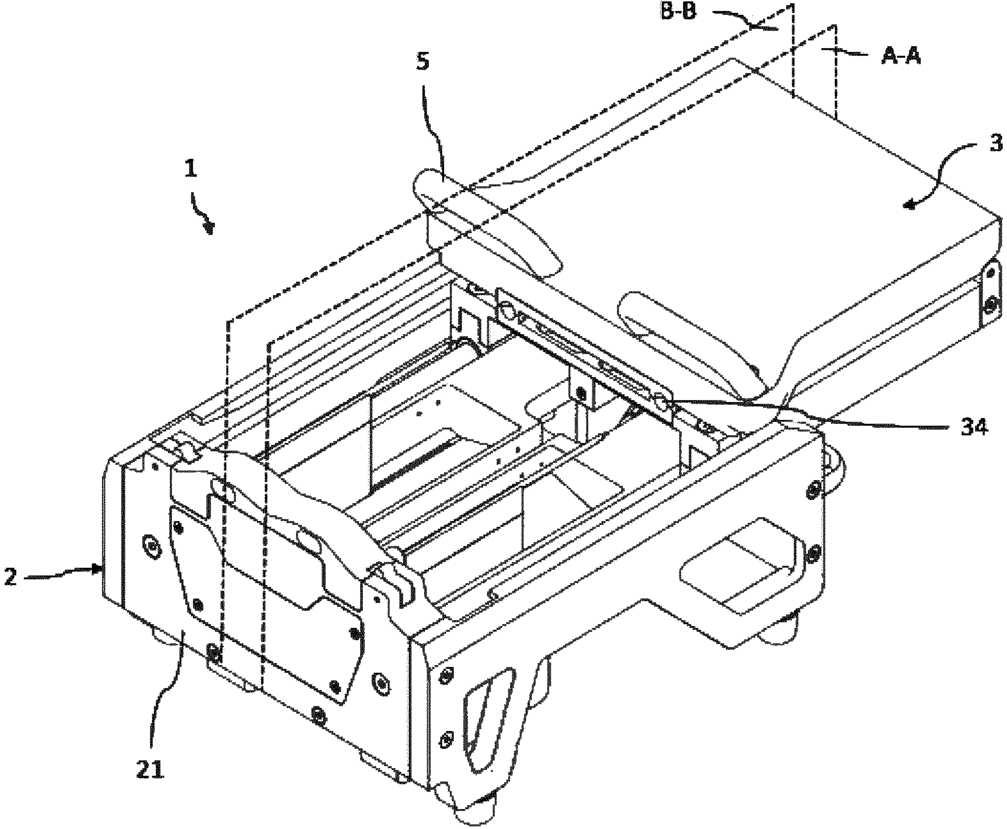

[Fig. 13B]
1 3 $P_{AR}$ 62 710 6 $P_H$ 23 21 2 7 72 92 11 931 93 930 9
A-A
[Fig. 13C]
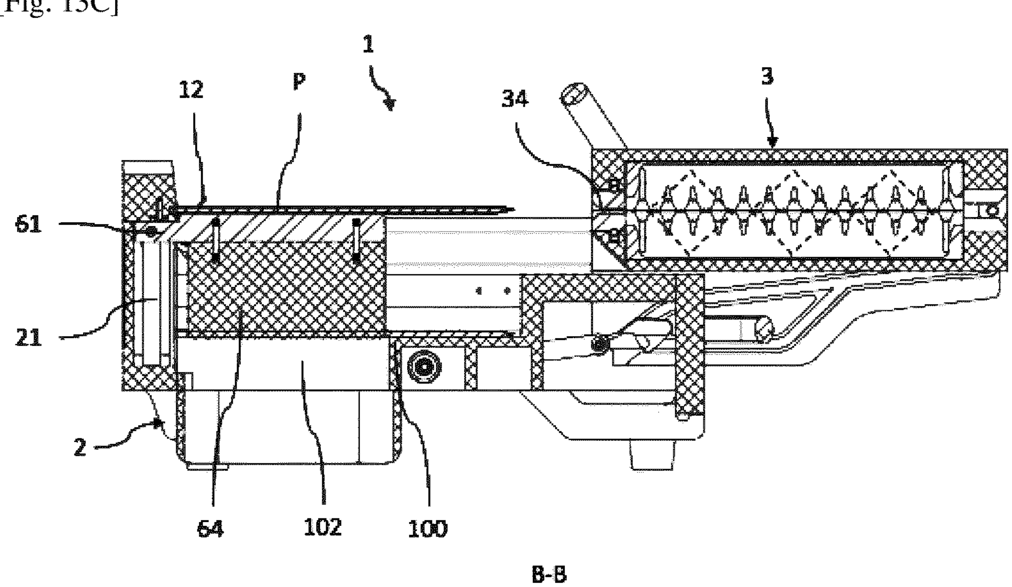
B-B

[Fig. 14A]
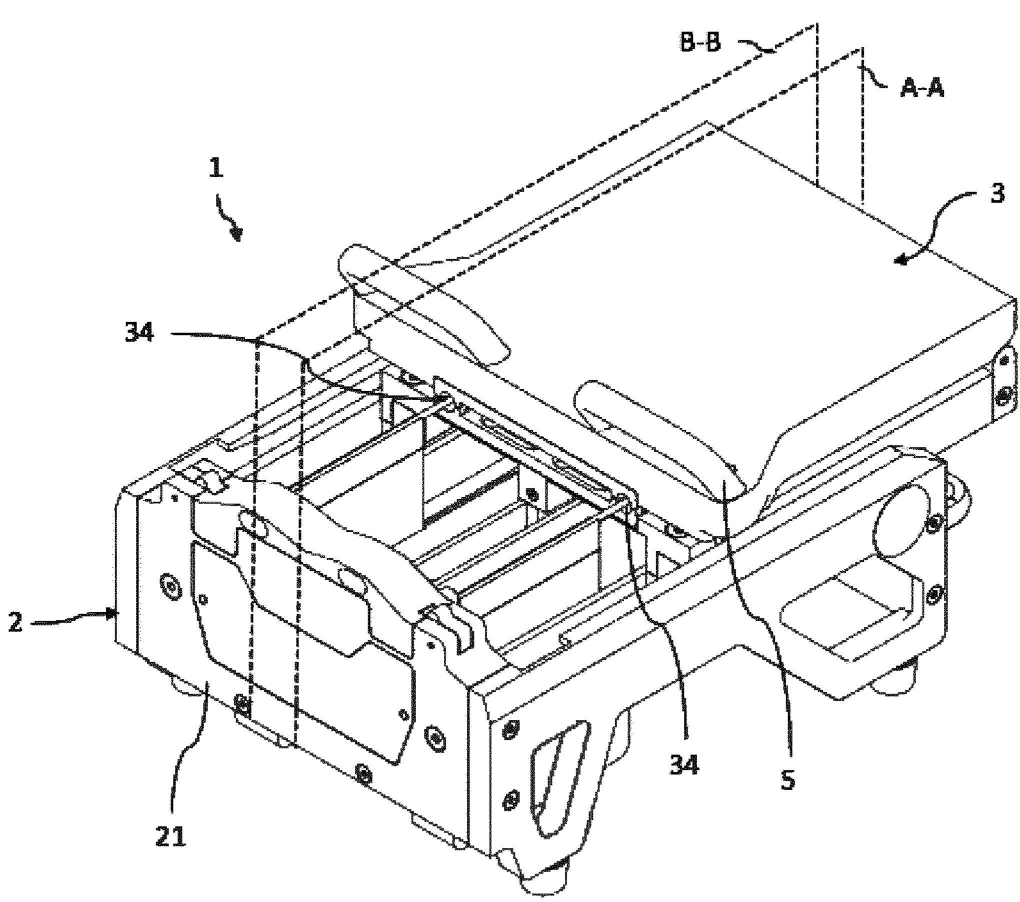
[Fig. 14B]
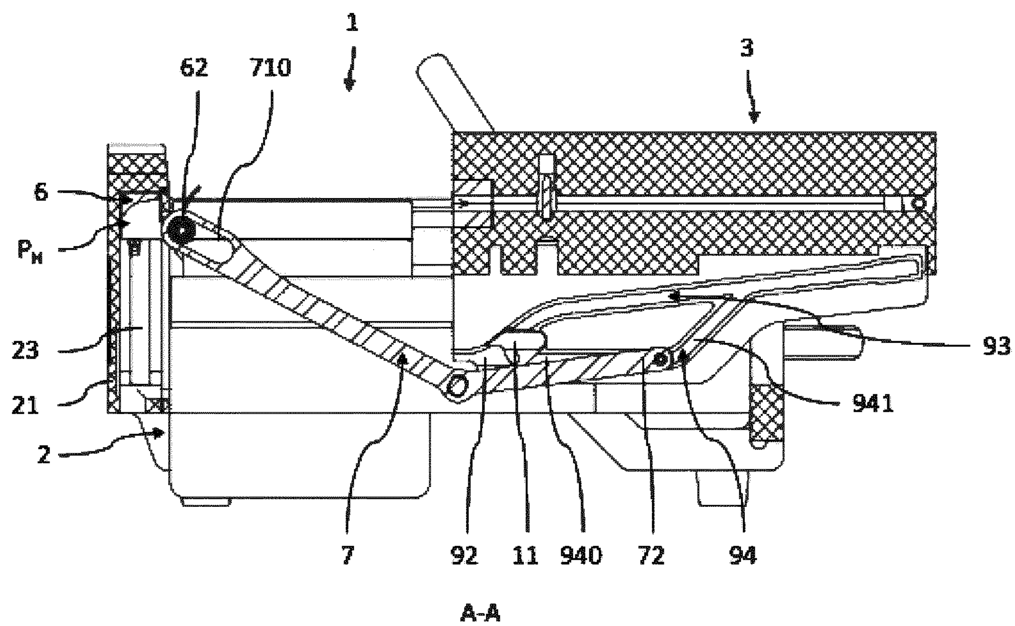

[Fig. 14C]
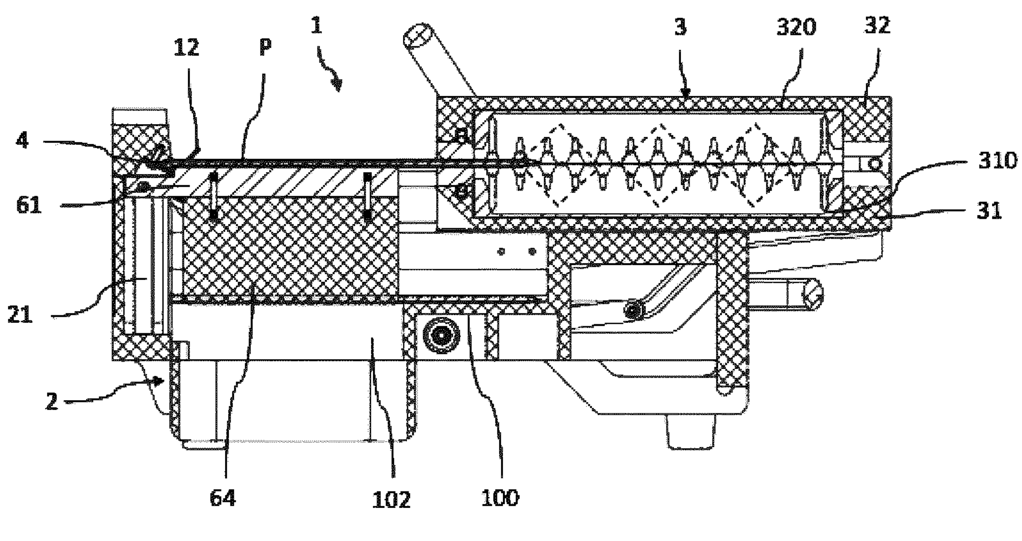
B-B
[Fig. 15A]
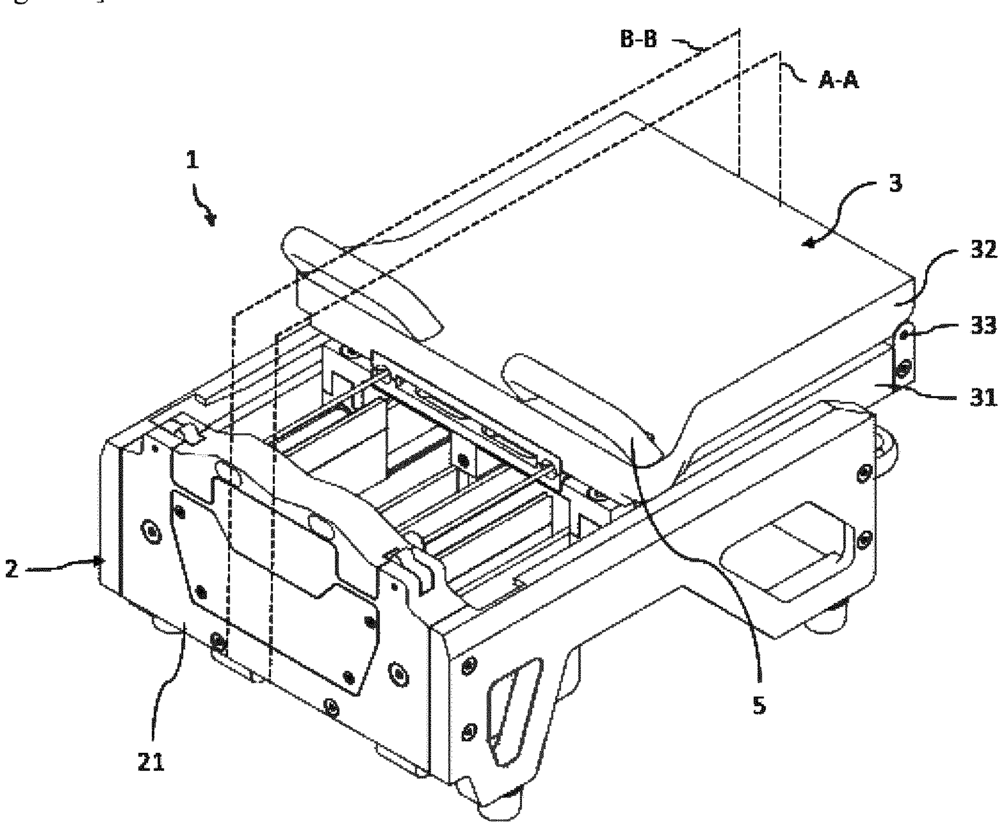

[Fig. 15B]
1
3
62
710
930
6
942
23
941
21
2
7
93
94
72
A-A
[Fig. 15C]
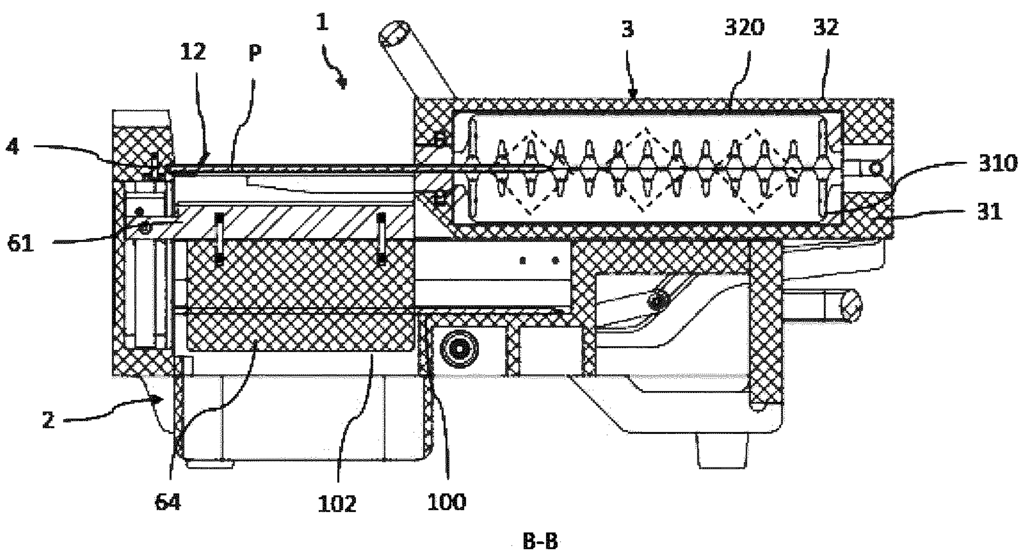

DEVICE FOR THE MANUFACTURE OF SKEWERS OF FOOD PRODUCTS COMPRISING A MOBILE SKEWER PICKER SYNCHRONIZED WITH THE MOVEMENT OF THE TRAYS FOR RECEIVING THE FOOD PRODUCTS

1. CROSS-REFERENCE TO RELATED APPLICATIONS

This application is a Section 371 National Stage Application of International Application No. PCT/EP2022/051688, filed Jan. 26, 2022, the content of which is incorporated herein by reference in its entirety, and published as WO 2022/161977 on Aug. 4, 2022, not in English.

2. FIELD OF THE INVENTION

The invention relates to a device for manufacturing skewers including two mobile trays positioned on top of each other by forming aligned cavities intended to receive foodstuffs. The invention relates more particularly to the fact that it includes a mechanism for transferring and positioning spikes in the axis of the cavities when the latter skewer the foodstuffs.

3. PRIOR ART

The invention is in the field of food. Professionals have portioning apparatuses that allow to produce individual portions from a product produced in large quantities by disposing them on spikes to facilitate cooking. More specifically, the present invention relates to a device for manufacturing skewers wherein various and varied foodstuffs are aligned and skewered on a straight spike.

Producing skewers first involves cutting compact food products such as: pieces of meat, whole or cut vegetables, fruit, sausages, diced cheese, etc. These different foods can be skewered manually on a spike, one after the other. Spikes can be simple, thin pieces of wood elongated and sharpened at one end, bamboo for example, these spikes being generally disposable. In some cases, the non-pointed end has a flattened end for better grip, or a sculpted head with a pattern.

Other spikes exist in metal. They have the same elongated shape and have a pointed end and another forming a loop for gripping.

The skewering operation done by hand is delicate and takes considerable time. Indeed, it is difficult for an operator to centre the spike in the middle of pieces of food products that are not immobilised, the risk being to sink the spike into the hand. On the other hand, food products have very different consistencies, viscosities and shapes and therefore the force to pass therethrough must be adapted accordingly. Finally, there is a large multitude of spikes of different shapes and diameters which increase the difficulty of the operation.

A device for manually manufacturing skewers aiming at facilitating the skewering of foodstuffs on spikes in order to constitute skewers is known in particular from patent application FR 3 076 185, belonging to the applicant of the present application. Such a device comprises a fixed base and a mobile assembly mounted to slide on the fixed base. The mobile assembly comprises lower and upper trays carrying at least one mould and at least one counter mould respectively. When the trays are positioned on top of each other, the mould and the counter-mould form longitudinal cavities capable of containing the food products previously disposed on the mould. The fixed base further carries a retractable guide system formed of three plates each comprising notches made so as to hold the spikes coaxially with the axes of the cavities. Once the food products are held in the cavities and the spikes placed in the guide system, the skewering of the food products on the spikes is carried out by sliding the mobile assembly towards the spike guiding system. The spikes are thus correctly centred in the middle of the food products. Such a device is advantageous but does not entirely satisfy the fact that it requires the manual positioning of the spikes which can be time-consuming. Indeed, after or before depositing and positioning the foodstuffs in the dedicated cavities, the operator must take then position the skewering spikes one by one in the notches of the guide system. The operation of positioning the spikes intervenes in the cycle of the operations of pulling and pushing the trays and of the operations of opening the trays and removing the skewers produced. The repetition of these actions therefore generates a certain muscular fatigue for the operator who becomes less rapid and/or precise during the execution of the operation of positioning the spikes.

There is therefore a real need for a solution allowing to simplify the operation and improve the rate of skewer production devices to properly align foodstuffs so that the spikes pass therethrough right in the centre.

4. SUMMARY

In order to solve at least the problems mentioned above, an exemplary embodiment of the present invention proposes a device for manufacturing at least one skewer comprising a frame and a carriage mounted to slide on the frame between a front position and a rear position, and vice versa, the mobile carriage comprising a lower tray cooperating with an upper tray, forming a cover, the upper tray being mounted to move between an open position and a closed (or folded) position, the lower and upper trays having recesses for receiving foodstuffs forming at least one row of aligned cavities when the upper tray is folded onto the lower tray and at least one orifice for passing a spike opening into the axis of the at least one row of aligned cavities, the skewering of the spike in the foodstuffs housed in the at least one row of aligned cavities being carried out by moving the mobile carriage from the rear position (also called the retracted position) to the front position (also called the forward position).

According to the invention, the skewer production device comprises at least one spike reservoir and one mobile spike extractor configured to selectively take at least one spike from said at least one reservoir, and to extract said at least one spike taken from the reservoir so as to position it facing the at least one orifice when the mobile carriage is in the rear position, and further comprises first synchronisation means configured to synchronise the movement of the mobile spike extractor with the movement of the mobile carriage comprising the trays.

The spike extractor is therefore, within the meaning of the proposed technique, a mobile element which ensures the removal or disengagement of at least one spike from the reservoir. For this purpose, the mobile spike extractor therefore engages at least partially, and temporarily, inside the reservoir to take a spike, then to extract it from the reservoir.

A device for manufacturing skewers having such means for synchronising the movement of the mobile spike extractor with the movement of the mobile carriage, allows the automatic placement of the spikes in the skewering position.

With a device in accordance with the proposed technique, except for disposing the foodstuffs in the cavities and recovering the produced skewers, the operator advantageously keeps his or her hands on the handles of the mobile carriage throughout the production process. This is advantageous compared to the prior art wherein the manual deposition of the spikes is time-consuming and requires special attention from the operator.

The movement of the mobile spike extractor being carried out during the movement of the mobile carriage (because it is connected thereto), the placement of the spikes is also immediate in the sense that it does not cause any interruption, or a negligible interruption, in the handling of the mobile carriage. Therefore, this results in particular in an increase in production rates and in an improvement in the comfort and working conditions of the operator.

Moreover, the automatic placement of the spikes in the skewering position is carried out by the device for manufacturing skewers itself. This allows the device to be autonomous, that is to say not to depend on an external installation dedicated to positioning the spikes. The device is thus easily transportable and, once it is installed, quickly usable.

According to a particular embodiment, the mobile spike extractor is mounted to slide on the frame between a low position and a high position, and vice versa, the extraction and the positioning of the spikes facing the at least one orifice being carried out by moving the mobile spike extractor from the low position to the high position. Furthermore, the synchronisation means are configured to synchronise:

- the raising of the mobile spike extractor from the low position to the high position with the movement of the mobile carriage from the front position to the rear position, corresponding to a backward movement of the mobile carriage, and
- the lowering of the mobile spike extractor from the high position to the low position with the movement of the mobile carriage from the rear position to the front position, corresponding to a forward movement of the mobile carriage.

The back and forth horizontal movement of the trays allows to raise and lower the blade(s) which select the spike(s) in the spike reservoir. In other words, the steps of pushing the trays away from the operator and pulling the trays towards the operator are synchronised with the raising and lowering of the spike selection system.

Such an arrangement, which is particularly advantageous when the spike reservoir is located below the mobile carriage, allows to minimise the space requirement of the device for manufacturing skewers. Thus, the device can be easily transported. It can also be easily stored and/or installed in relatively confined storage and/or work spaces.

According to another particular embodiment, the synchronisation means comprise at least one synchronisation lever pivotally mounted on the frame and having:

- a first end connected to the mobile spike extractor, and
- a second end, supporting a second roller disposed inside a synchronisation track formed on the mobile carriage, the synchronisation track having a first end, associated with the low position of the mobile spike extractor, and a second end, associated with the high position of the mobile spike extractor.

Such mechanical synchronisation means allow to ensure precise and efficient synchronisation of the movement of the mobile spike extractor with the movement of the mobile carriage. The absence of electronic means further allows a device comprising such synchronisation means to be used in a cold and/or humid working environment, in particular while minimising the risk of breakdowns and/or malfunctions, for example. Such mechanical synchronisation means are moreover simple in design and therefore simple to maintain.

According to another particular embodiment, the synchronisation lever has at its first end an oblong aperture cooperating with a first roller carried by the mobile spike extractor so that the pivoting of the synchronisation lever causes the movement of the first roller and the movement of the mobile spike extractor between the high and low positions, and vice versa.

Such a structure of the synchronisation lever constitutes a simple and effective solution for obtaining fluid, therefore non jerky, and precise guiding of the mobile spike extractor between the high and low positions, and vice versa. In particular, this reduces the risk of undesired ejection of the spikes from the mobile spike extractor when the latter is raised.

According to another particular embodiment, the mobile spike extractor comprises a crosspiece carrying the first roller, the frame and the crosspiece carrying sliding means allowing the vertical movement of the mobile spike extractor between the high and low positions, and vice versa.

According to another particular embodiment, the synchronisation track comprises first and second paths extending between the first and second ends of the synchronisation track, the first path being configured to be taken by the second roller when the mobile carriage moves back, the second path being configured to be taken by the second roller when the mobile carriage moves forward.

Such a configuration of the synchronisation track allows to prevent the spike carried by the mobile spike extractor from hitting the mobile carriage while allowing the mobile spike extractor to hold the spike in a stable position until it begins to enter the cavities comprising the foodstuffs. This eliminates the need to implement a dedicated system for guiding and positioning the spike in accordance with previous solutions. This allows in particular to simplify the construction of the device.

According to another particular embodiment, the production device comprises at least one one-way shutter allowing the movement of the second roller inside the first path when the mobile carriage moves back and preventing the second roller from moving inside the first path when the mobile carriage moves forward to guide the second roller in the second path.

According to another particular embodiment, the mobile spike extractor further comprises at least one spike extraction blade having on its upper face a groove for receiving and holding a spike from the reservoir.

The use of a blade, which is intrinsically a thin element, allows to prevent other spikes present in the reservoir from remaining balanced on a portion of the extraction blade or on the spike engaged on the blade in question. Such a blade further allows to limit the number of spikes moved in the reservoir when raising and lowering the blades therethrough. Therefore, this results in a reduction in the risk of ejection of the spikes outside the reservoir.

Moreover, the implementation of a groove on the upper part of the blade allows to minimise the risk of the extracted spike falling back into the reservoir when handling the device by the operator.

According to another particular embodiment, the spike extraction blade is disposed inside a slot formed in the bottom of the spike reservoir when the mobile spike extractor is in the low position, the extraction blade having a lower portion disposed inside the slot when the mobile spike extractor is in the high position.

Such a lower portion allows to avoid, in the absence of the extraction blade in the slot, that the spikes present in the reservoir escape therefrom through the slots under the effect of gravity, or that unused spikes block the lowering of the extraction blade. Such a lower portion thus allows to minimise the risk of accident for the operator, by preventing him from falling after having walked on spikes that have fallen to the ground, for example, and to minimise the risk of malfunction, or even deterioration, of the skewer production device.

According to another particular embodiment, the frame comprises at least one stop for positioning a spike against which the spike, disposed in the groove for receiving and holding the extraction blade in the high position of the mobile spike extractor, bears at the start of skewering the spike in the foodstuffs housed in the row of aligned cavities.

Such a positioning stop allows, after the initiation of the skewering operation, to immobilise the base of the spike in order to prevent it from becoming misaligned, or even that it breaks or is ejected. This allows in particular to prevent the operator from having to manually reposition or replace the spike. This further allows to minimise the risk of damage to the skewer production device, if for example a shard of a spike were to jam in the synchronisation means.

According to another particular embodiment, the production device comprises at least one deformable tab capable of holding the spike in the groove for receiving and holding the extraction blade in the high position of the mobile spike extractor.

Such a deformable tab allows to hold the spike in position in order to prevent it from being accidentally ejected at the end of the backward movement phase of the mobile carriage, and therefore when the mobile spike extractor reaches the high position. It has indeed been observed by the inventors that the device for manufacturing skewers was subject to vibrations mainly when the mobile carriage and/or the mobile spike extractor contact the end-of-stroke stops. Such vibrations can also appear when the mobile carriage and/or the mobile spike extractor are subject to significant decelerations or accelerations. These decelerations or accelerations essentially appear when the mobile carriage and/or the extractor arrive in the vicinity of the end-of-stroke stops, in order to avoid a shock against the latter. The implementation of the tabs allows to optimise the operation of the device by avoiding interrupting the production process to ensure manual repositioning of the spike and allows the operator to use the device dynamically without having to adjust or control how to push or pull the mobile carriage.

According to another particular embodiment, the deformable tab is positioned on said frame below the positioning stop, and the deformable tab is in the shape of a loop having an opening for the passage of a spike carried by an extraction blade of the mobile spike extractor, the deformable tab being bent towards the reservoir when the mobile spike extractor is in the low position and bent in the opposite direction when the mobile spike extractor is in the high position, a spike passing through the passage opening in the high position of the mobile spike extractor.

Such an arrangement and such a configuration of the deformable tab allow in particular the passage of the spike through the opening dedicated to this purpose. The advantage of this configuration is twofold, namely to allow the spike to bear against the positioning stop at the start of skewering, and therefore not to disturb the operation of the device, and to allow the upper and side edges of the spike to be held in order to optimise holding the spike in the skewering position.

According to another particular embodiment, the recesses of the lower and upper trays respectively support at least one mould and at least one counter mould made of a flexible material.

This allows not to damage the foodstuffs disposed in the cavities. Preferably, the mould(s) and counter mould(s) are made of silicone.

5. LIST OF THE FIGURES

Other features and advantages of the invention will appear more clearly upon reading the following description of particular embodiments, given by way of simple illustrative and non-limiting examples, and the appended drawings, among which:

FIGS. 1A to 1C show, according to perspective views and in different positions, an example of a skewer production device according to a first embodiment of the proposed technique;

FIG. 2 shows, in a partial perspective view, an example of mobile spike extractor mounted on the frame of the skewer production device according to FIGS. 1A to 1C;

FIGS. 3A to 3D show, according to partial perspective views, an example of means for synchronising a device for manufacturing skewers according to FIGS. 1A to 1C;

FIGS. 4A and 4B show, according to different focused perspective views, an example of a one-way shutter mounted in a synchronisation track forming part of the synchronisation means of FIGS. 3A to 3D;

FIGS. 5A to 5D show, in different views, the operation of the one-way shutter of FIGS. 4A and 4B;

FIG. 6 shows, in a perspective view, an example of a spike reservoir of the skewer production device according to FIGS. 1A to 1C;

FIGS. 7A and 7B show, in cross-sectional views, the interactions between the spike extraction blades carried by the mobile spike extractor according to FIG. 2 and the spike reservoir according to FIG. 6;

FIGS. 8A to 8C show, in different views and in different positions, deformable tabs of the skewer production device according to FIGS. 1A to 1C;

FIG. 9 is a flowchart of the main operating steps of a skewer production device according to FIGS. 1A to 1C;

FIGS. 10A to 15C show, according to different views, the skewer production device according to FIGS. 1A to 1C in different operating positions.

6. DESCRIPTION OF AN EMBODIMENT OF THE INVENTION

For the sake of clarity, the same elements were designated by the same references in the various figures.

Moreover, in the present description, the terms of orientation and positioning "lower", "upper", "front", "rear", etc. are used by arbitrarily referring to a normal position of use of a skewer production device, wherein two trays positioned on top of each other are mobile in a plane approximately parallel to the ground (horizontal) and slide between a proximal (front) and distal (rear) position relative to positioning stops of the spikes in the trays. When using such a device, the operator is located on the side of the positioning stops.

6.1 General Principle

The invention relates to a device for manufacturing one or more skewers. Such a device comprises a frame and a mobile carriage mounted to slide on the frame between a front position and a rear position, and vice versa. The mobile carriage comprises a lower tray cooperating with an upper tray, forming a cover. The upper tray is mounted to move between an open position and a closed or folded position. The lower and upper trays have recesses for receiving foodstuffs forming a row of aligned cavities when the upper tray is folded onto the lower tray and an orifice for passing a spike opening into the axis of the row of aligned cavities. The skewering of the spikes in the food products housed in the aligned cavities is carried out by moving the mobile carriage from the rear position to the front position. The device further comprises a spike reservoir, a mobile spike extractor configured to selectively extract one or more spikes from the reservoir. For this purpose, the extractor is configured to be introduced at least partially and temporarily into the reservoir in order to take and extract one or more spikes therefrom, and position the spike(s) facing the corresponding passage orifice when the mobile carriage is in the rear position. The device also comprises synchronisation means configured to synchronise the movement of the mobile spike extractor with the movement of the mobile carriage.

In this way, the front-to-back movement of the mobile carriage allows to extract spikes from the reservoir by means of the mobile extractor and to place them in position for skewering while the back-to-front movement of this same mobile carriage allows the skewering of the foodstuffs disposed between the trays on the spikes.

This front-to-back movement of the mobile carriage, and vice versa, is ensured by an operator using handles disposed on the mobile carriage. Without removing his hands from the handles, the operator can on the one hand automatically extract spikes from the reservoir by pushing back the mobile carriage (this step being ensured by the extractor which passes through the reservoir and takes, as it passes, one or more spikes in order to extract them from the reservoir), then skewer the food products on the spikes thus extracted by bringing the mobile carriage towards him.

In other words, certain steps in the operation of the skewer production device are carried out simultaneously, and in particular the movement of the mobile carriage which is synchronised with the movement of the spikes stored in the reservoir. The operator is no longer forced to manually position spikes facing the trays before skewering.

Therefore, this translates into a simplification of the use of the skewer production device and an improvement in productivity.

6.2 Description of an Embodiment

6.2.1 Device for Manufacturing Skewers

FIGS. 1A to 1C show in perspective, according to different views, an example of a device for manufacturing skewers wherein the movement of a mobile spike extractor, configured to take and extract spikes from a reservoir of the device and place the extracted spikes in position for skewering foodstuffs, is synchronised with the movement of a mobile carriage carrying pivoting trays, in accordance with the proposed technique.

The device 1 for manufacturing skewers comprises a frame 2 equipped with feet intended to place the device 1 on a surface, which is preferably horizontal. The frame 2 further comprises a rectangular empty space (not referenced) intended to receive other elements of the device as will be seen in more detail later.

The device 1 also comprises a mobile carriage 3 comprising a first tray 31, called the lower tray, and a second tray 32, called the upper tray. The lower tray 31 is disposed in the rectangular empty space of the frame 2. The upper tray 32, forming a cover, is pivotally mounted on the mobile carriage 3, by means of a hinge 33, between a closed or folded position $P_F$, shown in FIG. 1A, and an open position $P_o$, shown in FIG. 1B in particular.

The lower and upper trays 31, 32 respectively have recesses 310, 320 for receiving foodstuffs forming, when the upper tray 32 is folded onto the lower tray 31, parallel rows of aligned cavities. Each recess, and therefore each cavity formed by the superposition of two recesses belonging respectively to the lower and upper trays, extends longitudinally along an axis X. The axis X further defines the longitudinal axis of the device 1. Furthermore, the lower and upper trays 31, 32 have respectively on one of their edges complementary notches forming, when the upper tray 32 is folded onto the lower tray 31, orifices 34 for the passage of a spike. Each orifice 34 is oriented along the longitudinal axis X of a cavity and opens inside the latter, as illustrated in relation to FIG. 10 in particular.

Moreover, the mobile carriage 3 is mounted to slide on the frame 2 along the longitudinal axis X between a front position $P_{AV}$ and a rear position $P_{AR}$, and vice versa.

In the front position $P_{AV}$, as illustrated in relation to FIG. 1A in particular, the mobile carriage 3 is substantially pressed against the positioning stops 4 of the spikes, on the side of the user. These positioning stops 4 of the spikes, which are more visible in FIG. 8A in particular, are carried by a front portion 21 of the frame 2 on the side of which the user is positioned to handle the device. The positioning stops 4 are configured to immobilise the base of the spikes, that is to say the end of the spike opposite the tip, so as to prevent the unwanted movement of the spikes along the longitudinal axis X during the operation of skewering the foodstuffs on the spikes. When the mobile carriage 3 is moved by the operator using handles from the rear position $P_{AR}$ to the front position $P_{AV}$, that is to say when the operator pulls the mobile carriage towards him, the foodstuffs is thus skewered on the spikes.

In the rear position $P_{AR}$, as illustrated in relation to FIG. 1C in particular, the mobile carriage 3 is moved away from the positioning stops 4 by a distance greater than the length of the spikes P so as to allow the positioning of a spike extracted from the reservoir facing each of the orifices 34 of the mobile carriage 3. The skewering of the food products housed in the cavities on the spikes is therefore carried out by moving the mobile carriage 3 from the rear position $P_{AR}$ to the front position $P_{AV}$.

The device 1 for manufacturing skewers further comprises two handles 5 placed at the front of the upper tray 32, that is to say opposite the hinge 33. The handles allow to animate the pivoting of the upper tray 32 as well as the sliding of the mobile carriage 3 relative to the frame 2. Alternatively, the device may comprise a single handle when it allows the aforementioned operations to be carried out.

Moreover, the device 1 comprises a reservoir 10 of unused spikes which extends along the longitudinal axis X of the device 1. The reservoir 10 is disposed inside the rectangular empty space of the frame 2, below the lower tray 31 of the mobile carriage 3, and is irremovably fixed to the frame 2.

According to the invention, the device 1 further comprises a mobile spike extractor, configured to selectively take and extract spikes from the reservoir 10 initially, then to position a spike extracted from the reservoir facing each of the orifices 34 when the mobile carriage 3 is in the rear position $P_{AR}$. The device 1 moreover comprises synchronisation means configured to synchronise the movement of the mobile spike extractor with the movement of the mobile carriage 3. The mobile spike extractor and the synchronisation means, not visible in FIGS. 1A, 1B and 1C, will be described in detail later.

In the exemplary embodiment illustrated in relation to the figures, the device 1 comprises two aligned cavities for receiving food products, which are formed by the recesses 310, 320, and is thus capable of manufacturing two skewers at the same time. This number is only given by way of example, the device according to the invention can also be adapted to the production of a single or three or nine, or any number of skewers, depending in particular on the number of aligned cavities for receiving food products provided in the mobile carriage 3. Preferably, the recesses 310, 320 of the lower and upper trays 31, 32 respectively support a removable mould 311 and counter mould 321 made of a flexible material, such as silicone or a thermoplastic elastomer, so as not to damage the foodstuffs during the skewering operation. The hardness of the flexible material is determined in such a way as to ensure correct support while preserving the integrity of the foodstuffs.

The rotation hinge 33 of the upper tray 32 is disposed at the rear of the mobile carriage 3 so as to simplify the handling of the device 1.

The carriage 3 is mounted to slide on the frame 2 by means of two slides 22 carried by the frame 2. The slides 22 are formed by two rods, extending along the longitudinal axis X of the device 1, disposed inside the rectangular empty space of the frame 2 below the lower tray 31 of the mobile carriage 3. The longitudinal ends of each rod 22 are integral on either side of the frame 2, namely with the front portion 21, forming a front sliding stop, and with a rear portion (not visible), forming a rear sliding stop.

Moreover, the device 1 advantageously comprises deformable tabs 12 able to hold the spike on the mobile spike extractor. Such deformable tabs, more visible in FIGS. 8A to 8C, will be detailed subsequently.

6.2.2 Mobile Spike Extractor

FIG. 2 shows in perspective, and in isolation, an example of a mobile spike extractor slidably mounted on the frame of the skewer production device.

The mobile spike extractor 6 is, according to the example shown, slidably mounted on the frame 2 between a low position and a high position, and vice versa so that the extraction and positioning of the spikes (not shown) facing the orifices of the mobile carriage are carried out by moving the mobile spike extractor 6 from the low position to the high position.

Extraction blades 61, carried by the mobile spike extractor 6, ensure the removal and extraction of the spikes stored in the reservoir then the positioning of these spikes facing the orifices of the mobile carriage. The mobile spike extractor 6 has as many extraction blades 61 as there are rows of cavities present in the mobile carriage. The extraction blades respectively have a length shorter than the length of the spikes to avoid any contact with the mobile carriage during operation of the device. These blades are disposed in such a way as to be able to pass through the spike reservoir.

Furthermore, the mobile spike extractor 6 carries a first roller 62 forming part of the means for synchronising the movements of the mobile spike extractor 6 and the mobile carriage 3 which will be detailed later.

As illustrated, the mobile spike extractor 6 comprises a main body, substantially of rectangular parallelepiped shape, also called a crosspiece 60, slidably mounted on the frame 2.

For this purpose, the mobile spike extractor 6 has two through-holes 63 configured to cooperate with two vertical slides 23 carried by the front portion 21 of the frame 2. The slides are formed by two vertical rods 23 the longitudinal ends of which are integral on either side of the front portion 21 of the frame 2, namely with an upper part 211, forming an upper sliding stop, and with a lower part 212, forming a lower sliding stop.

Moreover, the mobile spike extractor 6 comprises two parallel extraction blades 61 projecting perpendicularly from the crosspiece 60 and being oriented along the longitudinal axis X of the device 1 in the direction of the mobile carriage 3.

The rim of each extraction blade 61 is oriented vertically and has a thickness corresponding substantially to the diameter of the spikes so as to ensure that each extraction blade 61 grabs a single spike at a time within the reservoir and then extract it from the reservoir. Indeed, such a thickness allows to prevent other spikes of the reservoir from remaining balanced on a portion of the extraction blade or on the spike engaged on the blade. Such an arrangement further allows to limit the number of spikes moved in the compartments of the reservoir during the raising and lowering of the blades therethrough. Therefore, this results in a reduction in the risk of ejection of the spikes outside the reservoir.

The extraction blades 61 each have, on their upper face 610, a groove 611 intended to receive and hold a spike present in the reservoir 10. Such a groove 611 allows to minimise the risk that the extracted spike falls back into the reservoir 10 during handling of the device 1 by the operator.

In the example illustrated, the first roller 62 is integral with a support element projecting perpendicularly from the crosspiece 60 and being oriented along the longitudinal axis of the device 1. The first roller 62 is arranged substantially in the middle of the crosspiece 60. A channel 66 is further formed in the crosspiece 60, facing the first roller 62, so as to allow the passage of the synchronisation means, namely the first end of the synchronisation lever as illustrated in relation to FIGS. 10B and 13B in particular.

Moreover, each extraction blade 61 carries a lower portion 64, formed by a plate, configured to prevent the spikes present in the reservoir from accidentally being introduced inside a slot 102 for receiving the extraction blade 61, as illustrated in relation to FIGS. 7A and 7B in particular.

6.2.3 Synchronisation Means

FIGS. 3A to 3D are different views of an example of means for synchronising the movement of the mobile spike extractor with the movement of the mobile carriage in a device for manufacturing skewers in accordance with the invention.

In the case where the reservoir of unused spikes is disposed under the mobile carriage, in accordance with the example illustrated, the synchronisation means are configured to connect the vertical sliding of the mobile spike extractor to the horizontal sliding of the mobile carriage.

More specifically, the synchronisation means are configured to synchronise the raising of the mobile spike extractor 6 from the low position to the high position with the movement of the mobile carriage 3 from the front position to the rear position, corresponding to a backward movement of the mobile carriage 3, and the lowering of the mobile spike extractor 6 from the high position to the low position with the movement of the mobile carriage 3 from the rear position to the front position, corresponding to a forward movement of the mobile carriage 3.

In the example illustrated, such coupling of the movements of the mobile carriage 3 and of the mobile spike extractor 6 is obtained by the implementation of synchronisation means comprising a synchronisation lever 7, a second roller 8 carried by the synchronisation lever 7, a synchronisation track 9 formed on the mobile carriage 3 wherein the second roller 8 is slidably movable and a first roller 62 of the mobile spike extractor 6 cooperating with the synchronisation lever 7.

As illustrated, the synchronisation lever 7 has a substantially "L" shape and is pivotally mounted, at its elbow, on the frame (not shown).

The synchronisation lever 7 has a first longitudinal end 71, called the first end, and a second longitudinal end 72, called the second end, located opposite the first end 71.

The first end 71 has an oblong aperture 710 configured to receive the first roller 62 carried by the mobile spike extractor 6. The first roller 62 is configured to be mobile inside the oblong aperture 710 during operation of the device. More specifically, and as described and illustrated in more detail below, the oblong aperture 710 allows the vertical movement of the first roller 62 during the pivoting of the synchronisation lever 7.

The second end 72 of the synchronisation lever 7 carries the second roller 8, partially visible in FIG. 3B, configured to move inside the synchronisation track 9 formed on the mobile carriage 3.

More specifically, the synchronisation track 9 is formed on a side face 350 of a plate 35 fixed under the lower tray 31. The plate 35 is oriented along the longitudinal axis of the device 1 so as to have a first longitudinal end 351 located at the rear of the mobile carriage 3 and a second longitudinal end 352 located at the front of the mobile carriage 3.

As illustrated, the synchronisation track 9 has a first end 91 associated with the low position of the mobile spike extractor 6, and a second end 92 associated with the high position of the mobile spike extractor 6.

The first end 91 of the synchronisation track 9 is located at the first longitudinal end 351 of the plate 35 in the vicinity of the lower tray 31. In other words, the first end 91 of the synchronisation track 9 is located in the upper rear part of the plate 35.

The second end 92 of the synchronisation track 9 is located at the second longitudinal end 352 of the plate 35, at a distance from the lower tray 31. In other words, the second end 92 of the synchronisation track 9, which is diagonally opposite the first end 91, is located in the lower part of the second longitudinal end 352 of the plate 35.

The synchronisation track 9 also has a first path 93, configured to be taken by the second roller 8 when the mobile carriage 3 moves back, and a second path 94, configured to be taken by the same second roller 8 when the mobile carriage 3 moves forward. These paths both extend between the first and second ends 91, 92.

As illustrated in relation to FIG. 3D, the first path 93 comprises a first segment 930 starting from the first end 91 and extended by a second segment 931 opening into the second end 92. The second roller 8 when it circulates in this first path thus describes a downward trajectory.

The first segment 930 is configured to initiate a slow rise of the mobile spike extractor as long as the mobile carriage is positioned above the extraction blades and the spikes carried by said blades. The second segment 931 is configured to allow the rapid rise of the mobile spike extractor as soon as the mobile carriage is far enough from the extraction blades and the spikes carried by said blades.

For this purpose, the first segment 930 has, with respect to the longitudinal axis of the device, that is to say with respect to a horizontal axis, a first slope of angle $\alpha$ and the second segment 931 has a second slope of angle $\beta$. The value of angle $\beta$ is greater than the value of angle $\alpha$.

The second path 94 in turn comprises a first segment 940 starting from the second end 92 and extended by a second segment 941, itself extended by a third segment 942 opening into the first end 91. The second roller 8 thus describes an upward trajectory when it circulates in this second path.

When the operator pulls the carriage towards him, the first segment 940 is configured to hold the mobile spike extractor in the high position until the spikes carried by the extraction blades enter the passage orifices opening into the cavities of the mobile carriage. The second segment 941 is configured to initiate a rapid lowering of the mobile spike extractor to prevent the mobile carriage from colliding with the extraction blades when it approaches the operator. The third segment 942 is configured to continue the slow lowering of the mobile spike extractor to the low position so as to prepare the extraction of the spikes for the next operating cycle of the device.

For this purpose, the first segment 940 has, relative to the longitudinal axis of the device, a slope of zero angle, the second segment 941 has a slope of angle $\gamma$ and the third segment 942 has a slope of angle $\alpha$. Furthermore, the first segment 940 of the second path 94 has a length less than the first segment 930 of the first path 93 and the value of the angle $\gamma$ of the second segment 941 of the second path 94 is substantially greater than the value of the angle $\beta$ of the second segment 931 of the first path 93.

The angle $\beta$ is determined so as to ensure rapid lowering of the extraction blades 61 to compensate for their immobility when the roller 8 slides in the first segment 940 of the second path 94. In other words, the angle $\beta$ is determined to prevent the extraction blades 61 from colliding with the mobile carriage 3. Such constraints cause the second segment 941 of the second path 94 to open into the first segment 930 of the first path 93 and therefore the third segment 942 of the second path 94 to coincide with a portion of the first segment 930 of the first path 93.

The respective function of each segment of the synchronisation track explains why the first and second paths have different arrangements and curvatures.

6.2.4 One-Way Shutter

An example of a one-way shutter structure disposed inside the synchronisation track of the skewer production device is presented in relation to FIGS. 4A to 5D.

FIGS. 4A and 4B show according to different perspective views, and in a focused manner, the structure of a one-way shutter. FIGS. 5A to 5D illustrate the movement of the one-way shutter as the second roller moves through the synchronisation track.

The one-way shutter 11, also called valve, is configured, on the one hand, to allow the movement of the second roller 8 inside the first path 93 of the synchronisation track when the mobile carriage 3 moves back, and to guide the second roller 8 towards the second end of the synchronisation track 9. The one-way shutter 11 is configured, on the other hand, to prevent the movement of the second roller 8 inside this same first path 93 when the mobile carriage 3 moves forward and to guide the second roller 8 towards the second path 94.

As illustrated, the one-way shutter 11 is located between and at the intersection of the second segment 931 of the first path 93 and the first segment 940 of the second path 94. It is arranged so as to separate the two paths 93, 94.

The one-way shutter 11 has, at a first end 110, a rotation shaft (not visible) disposed in an orifice (not visible) of the plate 35 and integral with the latter by means of a screw 13 to allow the pivoting of the one-way shutter 1, as illustrated in relation to FIG. 4B.

A spring 14 is integral, on the one hand, with the one-way shutter 11 and, on the other hand, with the plate 35. The spring 14 is configured to bring back and hold the one-way shutter 11 through the first path 93 in the absence of pressure exerted by the second roller 8 on the shutter 11. In the example shown, the turns 140 of the spring 14 are carried by the rotation shaft of the one-way shutter 11 and the two rectilinear ends 141, 142 of the spring 13, also called strands, are coupled to the plate 35 and to the one-way shutter 11. More specifically, the one-way shutter 11 has a lug 112 projecting parallel to the rotation shaft, disposed in an orifice 353 of the plate 35 to retain the end 142 of the spring 14.

The one-way shutter 11 further has a second end 111, opposite the first end 110, an upper face 113, disposed facing the first path 93, and a lower face (not visible), disposed facing the second path 94.

During the movement of the second roller 8 in the second segment 931 of the first path 93, as illustrated in relation to FIGS. 5A and 5B, the second roller 8 gradually puts pressure on the upper face 113 of the one-way shutter 11, causing the latter to pivot and the compression of the spring 14, until it presses the second end 111 of the one-way shutter 11 against the wall of the first segment 940 of the second path 94. Thus, the upper face 113 locally extends an edge of the second segment 931 of the first path 93 thus guiding the second roller 8 towards the second end 92 of the synchronisation track 9.

When the second roller 8 joins the second end 92 of the synchronisation track 9, as illustrated in relation to FIG. 5C, the spring 14, which is no longer compressed, brings back the one-way shutter 11 through the first path 93 to obstruct it. In such a position, the lower face of the one-way shutter 11 locally extends an edge of the first segment 940 of the second path 94 prompting the second roller 8 to take the second path 94, as illustrated in relation to FIG. 5D.

6.2.5 Spike Reservoir

An example of a spike reservoir structure of the device for manufacturing skewers, described above, is presented in relation to FIGS. 6 to 7B.

FIG. 6 shows in perspective, and in isolation, an example of reservoir storing a batch of unused spikes P. FIGS. 7A and 7B are cross sections of an extraction blade, in the low $P_B$ and high $P_H$ position respectively, cooperating with the reservoir.

As illustrated, the reservoir 10 is divided into two substantially symmetrical compartments 100 extending longitudinally. Each compartment 100 comprises an inclined bottom 101 ending in its lowest part with a slot 102, of rectangular parallelepiped shape, arranged vertically. Such an inclination allows to direct the spikes towards the extraction blades when they are disposed in the slots.

Each slot 102 is configured to receive, on the one hand, an extraction blade 61 which, when mounted within the reservoir, ensures the removal and extraction of a spike from the reservoir and, on the other hand, a lower portion 64 intended to prevent the spikes from entering the slot 102 in the absence of the extraction blade 61.

FIG. 7A shows the extraction blade 61 in the low position $P_B$. In such a position, each extraction blade 61 is preferably entirely housed in the associated slot 102 so as to ensure the positioning of a spike P in the dedicated reception groove 611.

FIG. 7B shows the extraction blade 61 in the high position $P_H$. In such a position, the extraction blade 61 ensures the positioning of the spike P positioned in the groove 611 for the skewering operation. Despite the fact that the extraction blade 61 has left the slot 102, the lower portion 64 remains partially disposed inside the slot.

Although this is not illustrated, it is understood that the lower portion 64 of the blade remains partially disposed inside the slot 102 throughout the movement of the extraction blade 61 from the low position $P_B$ to the high position $P_H$, and vice versa.

Such an arrangement allows to prevent the unused spikes present in the reservoir from escaping therefrom through the slots, under the effect of gravity, or the unused spikes from blocking the lowering of the extraction blade.

6.2.6 Deformable Tabs

FIGS. 8A to 8C show, in different views, an example of deformable tabs shown in different positions.

The deformable tabs 12 are capable of holding the spike facing the orifices when the mobile carriage reaches the rear position, and therefore when the mobile spike extractor 6 reaches the high position $P_H$, in order to prevent a sudden use of the device 1 from ejecting the spikes from the grooves 611 of the extraction blades 61.

For this purpose, the deformable tabs 12 are positioned on the frame 2 below the positioning stops 4 and are bent towards the reservoir 10 when they are not biased (at rest). This occurs as soon as the extraction blades 61 begin to be lowered sufficiently to no longer contact them, as illustrated in relation to FIGS. 8A and 8B.

Each deformable tab has a passage opening 120 configured to allow the passage of a part of the associated extraction blade 61 and of the spike P carried by the latter.

More specifically, during the raising of the mobile spike extractor 6, the spike carried by each extraction blade 61 contacts a portion of the corresponding deformable tab 12 causing its progressive deformation until it is bent in the opposite direction allowing the spike to pass through the passage opening 120. Thus, when the mobile spike extractor 6 is in the high position, as illustrated in FIG. 8C, the deformable tab 12, which tends to resume its non-deformed position downwards, presses the spike into the groove of the extraction blade 61.

As illustrated, the deformable tabs 12 here are in the shape of loops made of elastomer. The deformable tabs are fixed by means of screws 13 on an inclined wall 210 of the front part 21 of the frame 2, located under each positioning stop 4. Such an arrangement encourages the deformable tabs 12 to be bent towards the reservoir 10 when they are not biased by the mobile spike extractor 6.

6.2.7 Operation of the Skewer Production Device

The main operating steps of the device for manufacturing skewers, described above, will now be presented in relation to FIGS. 9 to 15C.

The flowchart of FIG. 9 focuses on the main operating steps of the device for manufacturing food product skewers. FIGS. 10A to 15C are views of the skewer production device illustrating the main operating steps, for a better understanding of the proposed technique.

In the initial position, illustrated in relation to FIGS. 10A to 100, the mobile carriage 3 is pressed against the front portion 21 of the frame 2 so as to be in the front position $P_{AV}$, close to the user. In such a position, the second roller (not visible) carried by the second end 72 of the synchronisation lever 7 is positioned in the first end 91 of the synchronisation track 9. Furthermore, the upper tray 32 is folded onto the tray 31.

Moreover, the mobile spike extractor 6 is pressed against the lower part 212 of the front portion 21 of the frame 2 so as to be in the low position $P_B$. In such a position, the first roller 62 of the mobile spike extractor 6 is located close to the rear end of the oblong aperture 710 provided on the first end 71 of the synchronisation lever 7. In this position again, the extraction blades 61 of the mobile spike extractor 6 are housed in the slots 102 of the compartments 100 of the reservoir so that a spike fits into the groove 611 of each extraction blade 61.

During a first step, referenced S1 and illustrated in relation to FIGS. 11A to 11C, the operator disposes the foodstuffs in the depressions of the lower tray 31 of the mobile carriage. If an operating cycle of the skewer production device has previously been implemented, the operator obviously removes the produced skewers from the lower tray 31 before inserting foodstuffs into the depressions of the lower tray 31.

For this purpose, the operator manipulates the handles of the device 1 to bring the upper tray 32 into the open position $P_o$, deposits the foodstuffs (shown in broken lines) on the moulds 311 of the lower tray 31 so as to centre them with respect to the orifices 34 then folds the upper tray 32 against the lower tray 31 to return to the closed position $P_F$. The foodstuffs disposed in the cavities of the mobile carriage 3 are thus held without being crushed by the moulds 311 and counter moulds 321 of the lower 31 and upper 32 trays respectively.

After folding the upper tray 32 against the lower tray 31, the operator manipulates the handles 5 to move back or push the mobile carriage 3 in order to place the spikes in the skewering position (second step, referenced S2 and illustrated in relation to FIGS. 12A to 13C).

During a first phase, illustrated in relation to FIGS. 12A to 12C, the backward movement of the mobile carriage 3 along the slides 22 forces the second roller 8 to leave the first end 91 of the synchronisation track 9 to take the first segment 930 of the first path 93. The slope of the first segment 930 being low, the movement of the second roller 8 causes a slow pivoting of the synchronisation lever 7. The first end 71 of the synchronisation lever 7 therefore moves the first roller 62 to slide the crosspiece 60 slowly along the slides 23. The mobile spike extractor 6 leaves the low position allowing the extraction blades 61 to leave the slots 102 of the compartments 100 of the reservoir in order to extract spikes P. The slow rise of the mobile spike extractor allows to prevent the extraction blades 61 and the extracted spikes from hitting the mobile carriage 3 located above them.

Furthermore, the deformable tabs 12, which are not biased, are bent towards the spike reservoir.

During a second backward movement phase, the extraction blades 61 carrying a spike are sufficiently far from the mobile carriage 3, the second roller 8 takes the second segment 931 of the first path 93 until reaching the second end 92 of the synchronisation track 9 having previously crossed the one-way shutter 11, as described in relation to FIGS. 5A to 5D. The slope of the second segment 931 being greater than that of the first segment 930, the movement of the second roller 8 causes a rapid pivoting of the synchronisation lever 7 and therefore a rapid rise of the mobile spike extractor 6 and its extraction blades 61. The rapid rise of the extraction blades 61 each carrying a spike P allows to compensate for the slow rise of the first phase.

During this second phase, before the mobile spike extractor 6 reaches the high position $P_H$, the spikes are gradually inserted into the passage openings of the deformable tabs 12 and the raising of the mobile extractor then causes the progressive deformation of the deformable tabs 12 upwards.

When the mobile carriage 3 is in the rear position $P_{AR}$, as illustrated in relation to FIGS. 13A to 13C, the second roller 8 is located in the second end 92 of the synchronisation track 9, the pivoting of the synchronisation lever 7 is finished and the mobile spike extractor 6 is pressed against the upper part 211 of the front portion 21 of the frame 2 so that it is in the high position $P_H$ thus allowing the spikes to be in the skewering position.

In such a position, the first roller 62 of the mobile spike extractor 6 is located close to the front end of the oblong aperture 710 formed on the first end 71 of the synchronisation lever 7. In such a position again, the lower portions 64 of the extraction blades 61 are partially disposed in the slots 102 of the compartments 100 of the reservoir to prevent the spikes from being introduced into the slots 102. Furthermore, the deformation of the deformable tabs 12 is such that they hold the base of the spikes to prevent the shocks occurring when the carriage arrives at the rear stop from removing the spikes from the channels of the extraction blades 61.

During a third skewering step, referenced S3 and illustrated in relation to FIGS. 14A to 15C, the operator manipulates the handles 5 to pull or move forward, that is to say towards him, the mobile carriage 3 in order to carry out the skewering of the foodstuffs on the spikes, that is to say the insertion of the spikes in the food products located between the trays in the mobile carriage.

During a first forward movement phase, illustrated in relation to FIGS. 14A to 14C, the forward movement of the mobile carriage 3 forces the second roller 8 to leave the second end 92 of the synchronisation track 9 to take the first segment 940 of the second path 94. The one-way shutter 11 prevents the second roller 8 from taking the first path 93, as described in relation to FIGS. 5A to 5D. The slope of the first segment 940 of the second path 94 being zero, the movement of the second roller 8 in this portion does not cause any pivoting of the synchronisation lever 7. The mobile spike extractor 6 therefore remains in the high position $P_H$ so that the extraction blades 61 hold the spikes P at the start of the skewering operation, as described below.

During this first forward movement phase, the spikes are introduced into the orifices 34 of the mobile carriage. When the spikes contact the first foodstuffs, initially, the spikes slightly move back and the bases of the spikes are positioned in the positioning stops 4. It is only after such a bearing that the spikes begin to skewer in foodstuffs.

During a second forward movement phase, initiated when the mobile carriage 3 arrives close to the extraction blades, the rapid lowering of the extraction blades 61 occurs, as illustrated in relation to FIGS. 15A to 15B.

In this second phase, the second roller 8 takes the second segment 941 of the second path 94. The slope of the second segment 941 of the second path 94 being significant, as described in relation to FIG. 4A in particular, the movement of the second roller generates a rapid pivoting of the synchronisation lever 7. The first end 71 of the synchronisation lever 7 therefore moves the first roller 62 to cause the crosspiece 60 to slide rapidly along the slides 23. The mobile spike extractor 6 thus leaves the high position in order to allow the extraction blades 61 to emerge quickly while leaving the spikes P in the skewering position. A rapid lowering of the extraction blades 61 is necessary to compensate for their immobility during the first lowering phase in order to prevent them from colliding with the mobile carriage 3.

During this second phase, the spikes continue to be inserted into the cavities containing the foodstuffs. Moreover, the lower portions 64 of the extraction blades 61 are inserted into the slots 102 of the compartments 100 of the reservoir.

During a third forward movement phase, initiated when the extraction blades 61 are sufficiently far from the mobile carriage 3, the second roller 8 takes the third segment 942 of the second path 94 until it reaches the first end 91 of the synchronisation track 9 to bring the device 1 to the forward position. Since the third segment 942 of the second path 94 corresponds to a portion of the first segment 930 of the first path 93 and therefore has the same slope, as described in relation to FIG. 3D in particular, the movement of the second roller causes a slow pivoting of the synchronisation lever 7 and therefore a slow lowering of the mobile spike extractor 6 and its extraction blades 61.

During this third phase, the mobile carriage 3 gradually bends the deformable tabs 12 upwards (opposite the reservoir) until they are pressed against the front part 21 of the frame 2. Thus, the deformable tabs 12 do not disturb the skewering operation.

When this third forward movement phase is finalised, the device 1 is then in the initial position, as illustrated in relation to FIGS. 10A to 100 and the spikes are housed in the mobile carriage through the foodstuffs, the skewers obtained then being able to be retrieved by the user.

The production of the skewers is finalised and can be repeated according to the order of the steps previously described.

It is noted that with such a device for manufacturing skewers, the placement of the spikes in the skewering position is done automatically without the intervention of the operator.

Furthermore, the placement of the spikes is carried out during the movement of the mobile carriage having the cavities containing the foodstuffs. This automatic placement of the spikes does not lengthen the duration of the skewer production process but, on the contrary, reduces it. This is reflected in particular by an increase in production rates and an improvement in the comfort and working conditions of the operator.

Moreover, except for disposing the foodstuffs in the cavities of the mobile carriage, the operator can keep his hands on the manipulation handle(s) throughout the skewer production process. Again, this allows for improved operator comfort.

6.3 Other Embodiments and Various Features

Preferably, the holes made in the crosspiece of the mobile spike extractor which are configured to cooperate with the vertical rods of the frame, carry ball sockets to ensure precise guiding of the mobile spike extractor with respect to the frame.

In a particular embodiment, the lower portions of the extraction blades are made of a plastic material in order to limit the weight and the production costs of the skewer production device.

According to particular implementations, not illustrated, the means allowing to synchronise the movement of the mobile spike extractor with the movement of the mobile carriage implement electronic and/or electromechanical means. Thus, the synchronisation means comprise, according to a particular embodiment, first sensors configured to determine the horizontal position of the mobile carriage and the speed of movement thereof, second sensors configured to determine the vertical position of the extraction blades and the speed of movement thereof, at least one actuator, which is linear or rotary, configured to move the extraction blades vertically and a processing unit, such as an automaton, configured to control, in position and speed, the movement of the extraction blades relative to the position and speed of movement of the mobile carriage carrying the trays.

It is possible not to implement speed sensors.

In a particular embodiment, the device further comprises an interface allowing an operator to adjust all or part of the operating parameters of the device, and in particular the electronic synchronisation means. For example, the device can comprise electronically adjustable stops so as to block the sliding of the mobile carriage at a predetermined position according to the length of the spikes entered on the interface. Thus, the sliding amplitude of the mobile carriage will be reduced for short spikes for example. This allows in particular to improve the operator's comfort and work rate and minimises unnecessary actions.

According to a particular implementation, not illustrated, the spike reservoir comprises a single compartment having a convex bottom and the lower parts of which end in vertical slots.

According to a particular approach, not illustrated, the lower portion of each extraction blade has substantially the shape of a comb so as to further reduce the weight of the skewer production device. According to another particular approach, not illustrated, each extraction blade and its lower portion are made in one single piece.

In another embodiment, not illustrated, each deformable tab has one end fixed above a positioning stop and a free end on which the passage opening is formed. Thus, when the mobile spike extractor is in the high position, the deformable tab which tends to return to its undeformed position, exerts pressure on the spike allowing it to be held in the groove of the extraction blade.

In another embodiment, not shown, the deformable tabs are carried by the mobile carriage either by the upper tray or by the lower tray. The choice of the positioning of the deformable tabs essentially depends on their shape and/or the positioning of the passage openings, if they are present, of the extraction blades.

Obviously, the invention is not limited to the embodiments described above and provided only by way of examples. It encompasses various modifications, alternative forms and other variants that a person skilled in the art may consider in the context of the present invention and in particular all combinations of the various modes of operation described previously, which may be taken separately or in combination.

For example, the person skilled in the art will know how to adapt the shape and disposition of the mobile spike extractor, as well as the elements which compose it, according to the overall structure of the skewer production device, and in particular the number of skewers that it must produce. For example, if the skewer production device is configured to allow the simultaneous production of four skewers, the device can comprise two mobile spike supports in accordance with the one illustrated or only one mobile spike extractor carrying four extraction blades and one or even several first rollers, for a better distribution of the forces. The person skilled in the art will further know how to determine the length and/or the slope of each segment forming the synchronisation track so as to obtain the operation described according to the dimensions and the structural variants of the device in particular.

According to another example, the disposition of the synchronisation lever and of the synchronisation track is reversed, by providing the synchronisation track in/on the mobile extractor and pivotally fixing the synchronisation lever to the mobile carriage. According to yet another example, the device for manufacturing skewers comprises a fixed support carrying the lower and upper trays and a mobile frame/chassis. Thus, the operator therefore no longer slides the trays but the mobile chassis carrying the mobile spike extractor.

More generally, the proposed technique covers all the implementations of the principle according to which the movement of a member for extracting at least one spike present in a reservoir and positioning said at least one spike facing at least one cavity of the trays containing the foodstuffs, is synchronised with the movement of the mobile carriage carrying the trays.

The solution of the proposed technique therefore allows to have a device for manufacturing skewers allowing automatic and immediate positioning of the spikes, without manual intervention, in the sense that it generates no interruption, or a negligible interruption, in the handling of the mobile carriage.

The device allows the production of food skewers such as meat and/or vegetables, fish, fruit or others.

Spikes can be made of wood, plastic or metal.

Moreover, the upper tray can move parallel to the lower tray and not pivotally relative to the latter.

According to various aspects, the proposed technique therefore has all or part of the following advantages, depending on the embodiments adopted:

- allow the automatic placement of spikes in the skewering position;
- allow the immediate placement of spikes in the skewering position;
- guarantee the autonomy of the device for manufacturing at least one skewer with respect to external systems and/or installations;
- allow simplified use;
- allow limited space requirement;
- allow easy transport;
- allow a simplified and quick installation;
- guarantee a significant longevity;
- require limited maintenance;
- guarantee simplified maintenance;
- improve operator comfort;
- guarantee the safety of the operator;
- limit the loss of consumables;
- etc.

An exemplary embodiment of the present disclosure aims at proposing a new apparatus for manufacturing skewers, including a mould and a counter-mould allowing to immobilise the foodstuffs during skewering and to centre them in the middle of the spikes of the skewers, allowing automatic positioning of a spike in the skewering position, thus minimising operator interventions.

Although the present disclosure has been described with reference to one or more examples, workers skilled in the art will recognize that changes may be made in form and detail without departing from the scope of the disclosure and/or the appended claims.

The invention claimed is:

1. A device for manufacturing at least one skewer, the device comprising:

- a frame;
- a mobile carriage mounted to slide on the frame between a front position and a rear position, and vice versa, said mobile carriage comprising a lower tray cooperating with an upper tray, forming a cover, the upper tray being mounted to move between an open position and a closed or folded position, the lower and upper trays having recesses for receiving foodstuffs forming at least one row of aligned cavities when the upper tray is folded onto the lower tray and at least one orifice for passing a spike opening into the axis of said at least one row of aligned cavities, the skewering of said at least one spike in the foodstuffs housed in said at least one row of aligned cavities being carried out by moving the mobile carriage from the rear position to the front position;
- at least one spike reservoir;
- a mobile spike extractor configured to be engaged inside the reservoir so as to selectively take at least one spike from said at least one reservoir and extract said at least one spike from said reservoir to position said at least one spike facing said at least one orifice when the mobile carriage is in the rear position; and
- a synchronizer configured to synchronise movement of said mobile spike extractor with movement of said mobile carriage comprising the lower and upper trays.

2. The device for manufacturing at least one skewer according to claim 1, wherein said mobile spike extractor is slidably mounted on the frame between a low position and a high position, and vice versa, the extraction and the positioning of the spikes facing said at least one orifice being carried out by moving said mobile spike extractor from the low position to the high position, and wherein said synchronizer is configured to synchronise:

- raising of said mobile spike extractor from the low position to the high position with the movement of said mobile carriage from the front position to the rear position, corresponding to a backward movement of the mobile carriage, and
- lowering of said mobile spike extractor from the high position to the low position with the movement of said mobile carriage from the rear position to the front position, corresponding to a forward movement of said mobile carriage.

3. The device for manufacturing at least one skewer according to claim 2, wherein said synchronizer comprises at least one synchronisation lever pivotally mounted on said frame and having:

- a first end connected to said mobile spike extractor, and
- a second end, supporting a second roller disposed inside a synchronisation track formed on said mobile carriage, said synchronisation track having a first end, associated with said low position of said mobile spike extractor, and a second end, associated with said high position of said mobile spike extractor.

4. The device for manufacturing at least one skewer according to claim 3, wherein the synchronisation lever has at the first end an oblong aperture cooperating with a first roller carried by said mobile spike extractor so that pivoting of the synchronisation lever causes movement of said first roller and movement of the mobile spike extractor between the high and low positions, and vice versa.

5. The device for manufacturing at least one skewer according to claim 4, wherein said mobile spike extractor comprises a crosspiece carrying said first roller, said frame and said crosspiece carrying a slide allowing the movement of the mobile spike extractor between the high and low positions, and vice versa.

6. The device for manufacturing at least one skewer according to claim 3, wherein said synchronisation track comprises first and second paths extending between said first and second ends of said synchronisation track, said first path being configured to be taken by said second roller when said mobile carriage moves back, said second path being configured to be taken by said second roller when said mobile carriage moves forward.

7. The device for manufacturing at least one skewer according to claim 6, wherein the device comprises at least one one-way shutter allowing movement of said second roller inside the first path when said mobile carriage moves back and preventing said second roller from moving inside the first path when said mobile carriage moves forward to guide the second roller in the second path.

8. The device for manufacturing at least one skewer according to claim 2, wherein said mobile spike extractor further comprises at least one spike extraction blade having an upper face comprising a groove for receiving and holding a spike from the reservoir.

9. The device for manufacturing at least one skewer according to claim 8, wherein said at least one spike extraction blade is disposed inside a slot formed in a bottom of the spike reservoir when said mobile spike extractor is in the low position, said at least one extraction blade having a lower portion disposed inside the slot when said mobile spike extractor is in the high position.

10. The device for manufacturing at least one skewer according to claim 8, wherein said frame comprises at least one stop for positioning a spike against which the spike, disposed in the groove for receiving and holding said at least one extraction blade in the high position of said mobile spike extractor, bears at the start of skewering the spike in the foodstuffs housed in said at least one row of aligned cavities.

11. The device for manufacturing at least one skewer according to claim 8, wherein the device comprises at least one deformable tab capable of holding the spike in the groove for receiving and holding said at least one extraction blade in the high position of said mobile spike extractor.

12. The device for manufacturing at least one skewer according to claim 10, wherein:

the device comprises at least one deformable tab capable of holding the spike in the groove for receiving and holding said at least one extraction blade in the high position of said mobile spike extractor; and said at least one deformable tab is positioned on said frame below said at least one positioning stop, and wherein said deformable tab is in a shape of a loop having an opening for passage of a spike carried by an extraction blade of said mobile spike extractor, said deformable tab being bent towards the reservoir when said mobile spike extractor is in the low position and bent in an opposite direction when said mobile spike extractor is in the high position, a spike passing through the passage opening in said high position of said mobile spike extractor.

* * * * *